US012663625B2

(12) United States Patent
Hatada

(10) Patent No.: US 12,663,625 B2
(45) Date of Patent: Jun. 23, 2026

(54) ZOOM LENS AND IMAGE PICKUP APPARATUS

(71) Applicant: CANON KABUSHIKI KAISHA, Tokyo (JP)

(72) Inventor: Takahiro Hatada, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 270 days.

(21) Appl. No.: 18/616,257

(22) Filed: Mar. 26, 2024

(65) Prior Publication Data

US 2024/0369812 A1 Nov. 7, 2024

(30) Foreign Application Priority Data

May 1, 2023 (JP) ................................. 2023-075469

(51) Int. Cl.
    *G02B 15/14* (2006.01)
    *G02B 15/22* (2006.01)

(52) U.S. Cl.
    CPC . *G02B 15/1461* (2019.08); *G02B 15/145121* (2019.08); *G02B 15/22* (2013.01)

(58) Field of Classification Search
    CPC ........ G02B 15/1461; G02B 15/145121; G02B 15/22
    See application file for complete search history.

(56) References Cited

U.S. PATENT DOCUMENTS 9,036,265 B2 5/2015 Hatada
9,684,155 B2 6/2017 Hatada 10,120,170 B2 11/2018 Hatada
10,895,722 B2 1/2021 Hatada
11,269,165 B2 3/2022 Hatada
11,314,064 B2 4/2022 Hatada
11,435,563 B2 9/2022 Hatada
11,782,251 B2 10/2023 Hatada
2020/0292797 A1* 9/2020 Nakayama ..... G02B 15/145117
2021/0181462 A1 6/2021 Hatada
2021/0405336 A1* 12/2021 Yamada ......... G02B 15/145125
2022/0244508 A1 8/2022 Hatada
2023/0020736 A1 1/2023 Hatada
2023/0213732 A1 7/2023 Hatada
2024/0201470 A1 6/2024 Hatada

FOREIGN PATENT DOCUMENTS

JP 2004-198529 A 7/2004
JP 2013-160944 A 8/2013
JP 2014-029375 A 2/2014

* cited by examiner

*Primary Examiner* — Mariam Qureshi
(74) *Attorney, Agent, or Firm* — Carter, DeLuca & Farrell LLP

(57) ABSTRACT

A zoom lens includes, in order from an object side to an image side, a first lens unit having positive refractive power, a second lens unit having negative refractive power, and a rear group having positive refractive power as a whole and including three or more lens units. During zooming, all lenses move and a distance between adjacent lens units changes. A lens unit closest to an image plane in the rear group moves toward the object side during zooming from a wide-angle end to a telephoto end. The first lens unit consists of, in order from the object side to the image side, one negative lens and two positive lenses. Predetermined inequalities are satisfied.

20 Claims, 8 Drawing Sheets

SPHERICAL
ABERRATION

ASTIGMATISM

DISTORTION (%)

CHROMATIC
ABERRATION

ZOOM LENS AND IMAGE PICKUP APPARATUS

BACKGROUND

Technical Field

One of the aspects of the embodiments relates to a zoom lens suitable for image pickup apparatuses such as video cameras, electronic still cameras, broadcasting cameras, and surveillance cameras.

Description of Related Art

Zoom lenses for the above image pickup apparatuses are required to have high performance, few aberrations, and high resolution up to high spatial frequencies. In such a zoom lens, deterioration of optical characteristics due to diffraction is not negligible. Since the deterioration of imaging performance due to diffraction is determined by the F-number of the zoom lens, the zoom lens is to have a bright maximum aperture (large aperture ratio). In order to reduce noises during imaging in a dark place, a bright F-number is required over the entire zoom range. Furthermore, the zoom lens is to have a small size and a high zoom ratio.

As a large-aperture zoom lens that is beneficial to high performance, Japanese Patent Laid-Open No. 2004-198529 discloses a negative lead type zoom lens with a four-unit configuration of negative, positive, negative, and positive refractive powers. As a large-aperture zoom lens that is beneficial for a high zoom ratio, Japanese Patent Laid-Open Nos. 2014-29375 and 2013-160944 disclose a positive lead type zoom lens having a four-unit configuration of positive, negative, positive, and positive refractive powers.

The negative lead type large-aperture zoom lens disclosed in Japanese Patent Laid-Open No. 2004-198529 has difficulty in obtaining a high zoom ratio in reducing its size. The maximum aperture significantly fluctuates due to zooming. The positive lead type large-aperture zoom lenses disclosed in Japanese Patent Laid-Open Nos. 2014-29375 and 2013-160944 have difficulty in securing the back focus and reducing the size in widening the angle of view due to the high zoom ratio.

SUMMARY

A zoom lens according to one aspect of the disclosure includes, in order from an object side to an image side, a first lens unit having positive refractive power, a second lens unit having negative refractive power, and a rear group having positive refractive power as a whole and including three or more lens units. During zooming, all lenses move and a distance between adjacent lens units changes. A lens unit closest to an image plane in the rear group moves toward the object side during zooming from a wide-angle end to a telephoto end. The first lens unit consists of, in order from the object side to the image side, one negative lens and two positive lenses. The following inequalities are satisfied:

$$14.71 \leq R1r/fw \leq 25.0$$

$$0.2 \leq mL1/f1 \leq 0.7$$

$$20 \leq vd1n \leq 30$$

where $R1r$ is a radius of curvature of a lens surface closest to the image plane in the first lens unit, $fw$ is a focal length of the zoom lens at the wide-angle end, $mL1$ is a moving amount of the first lens unit during zooming from the wide-angle end to the telephoto end, the moving amount from the image side to object side the being defined to be positive, $f1$ is a focal length of the first lens unit, and $vd1n$ is an Abbe number of the negative lens in the first lens unit based on d-line. An image pickup apparatus having the above zoom lens also constitutes another aspect of the disclosure.

Further features of the disclosure will become apparent from the following description of embodiments with reference to the attached drawings.

DESCRIPTION OF THE EMBODIMENTS

Examples of this disclosure will be described below with reference to the drawings. Prior to a specific description of Examples 1 to 5, common matters to each example will be explained. A zoom lens according to each example is used as an imaging lens for an image pickup apparatus such as a video camera, a digital camera, a broadcasting camera, a surveillance camera, and a film-based camera.

The zoom lens according to each example is a positive lead type zoom lens that includes, in order from the object side to the image side, a first lens unit having positive refractive power (refractive power is a reciprocal of a focal length), a second lens unit having negative refractive power, three or more lens units, and a rear group that has positive refractive power as a whole. In the positive lead type zoom lens, the second lens unit has the main magnification variation (zooming) effect. The effective diameter of the first lens unit, the thickness of the first lens unit, etc. significantly affect the size of the entire zoom lens.

Thus, in order to achieve high optical performance over the entire zoom range, a high zoom ratio, and a reduced size of the entire zoom lens, it is important for the positive lead type zoom lens to properly set the refractive powers of the first and second lens units and the lens configuration, etc. It is also important to properly set the lens configuration of the lens unit included in the rear group on the image side of the second lens unit. It is also important to properly set a moving condition such as a moving direction and a moving amount of the lens unit during zooming in order to obtain a large aperture ratio and high optical performance over the entire zoom range.

Figure 1:
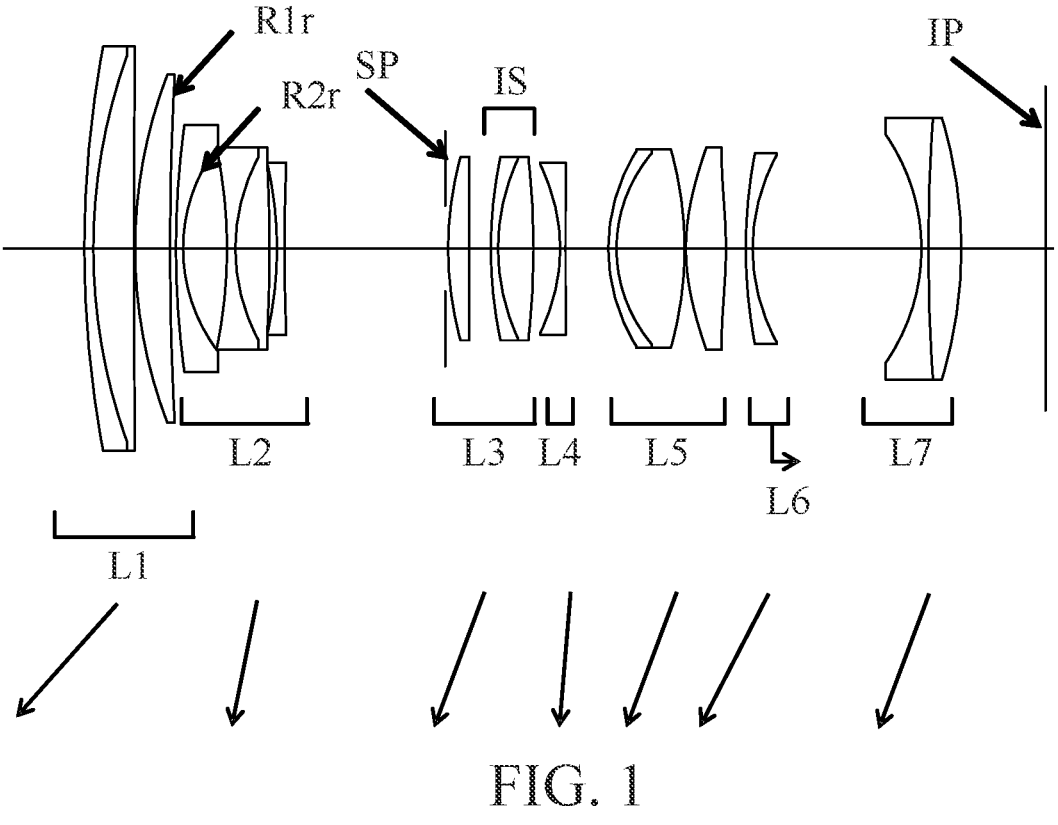
FIG. 1 is a sectional view illustrating the configuration of a zoom lens according to Example 1.
Figure 2:
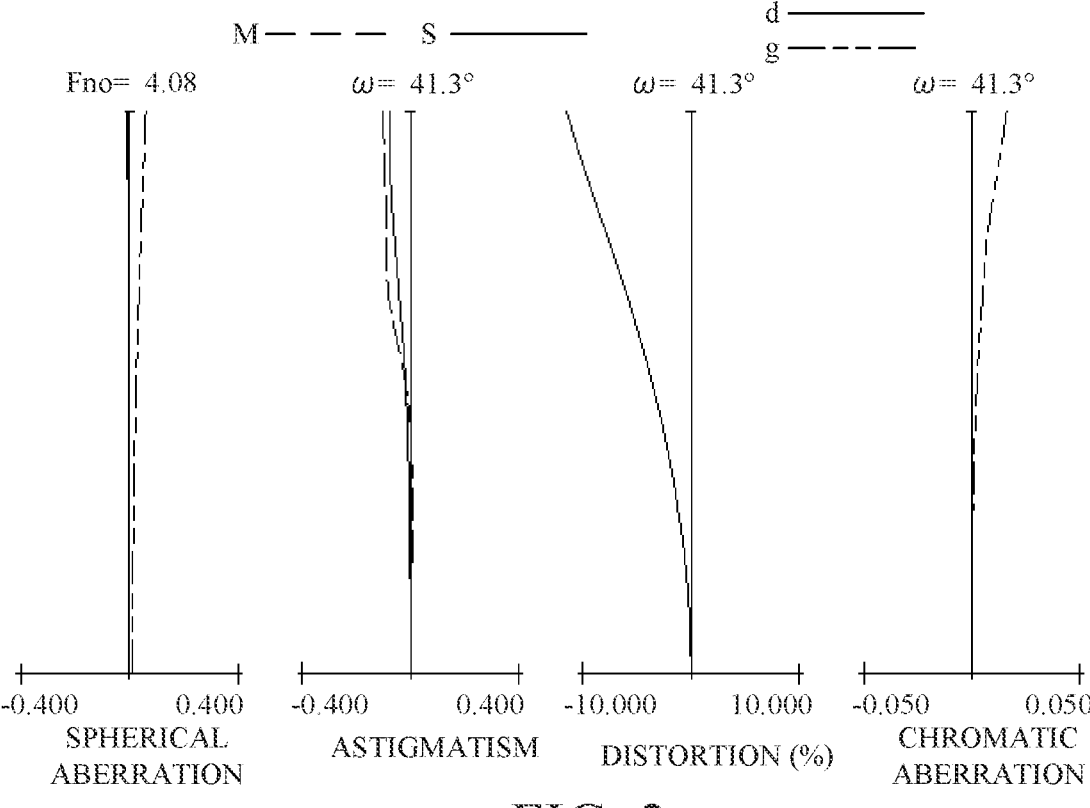
FIG. 2 is a longitudinal aberration diagram of the zoom lens according to Example 1 at a wide-angle end.
Figure 3:
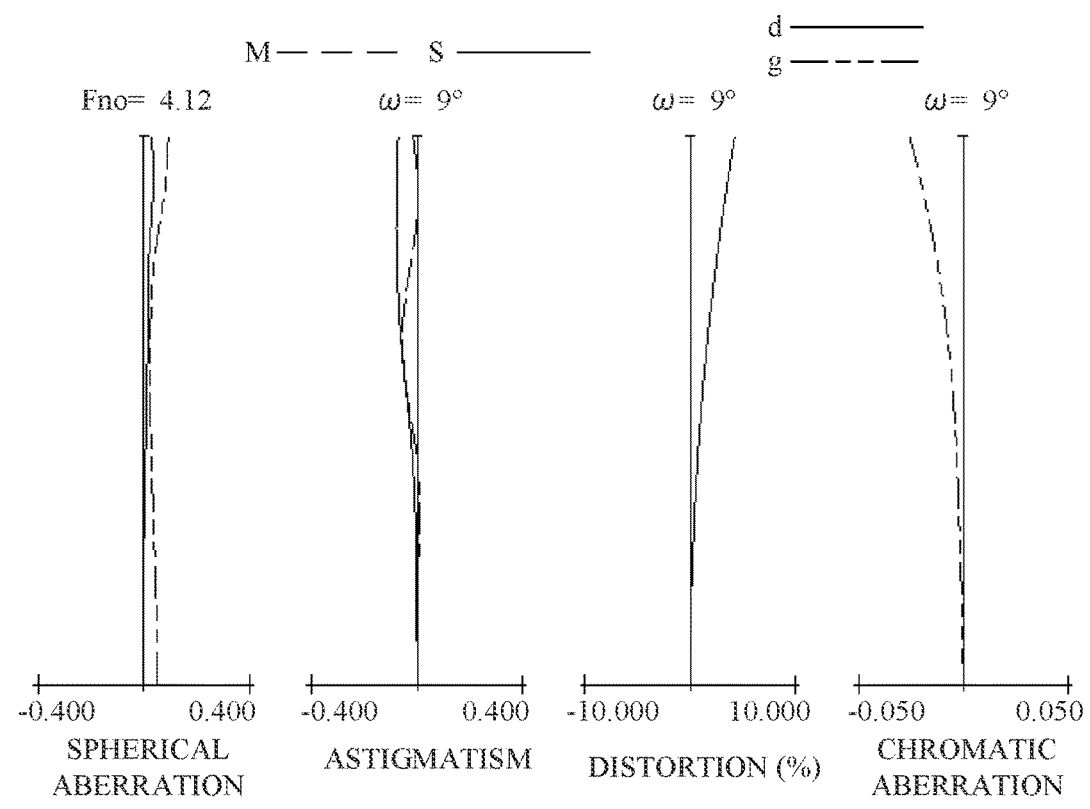
FIG. 3 is a longitudinal aberration diagram of the zoom lens according to Example 1 at a telephoto end.

FIG. 1 illustrates the configuration of the zoom lens according to Example 1. Referring now to FIG. 1, a description will be given of the characteristic of the zoom lens according to each example. In FIG. 1, a left side is an object side (front side), and a right side is an image side (rear side). L1 represents a first lens unit, L2 represents a second lens unit, and L3 to L7 respectively represent third to seventh lens units included in the rear group. SP represents an aperture stop (diaphragm), and IP represents an image plane. Disposed on the image plane IP is an imaging surface (light-receiving surface) of an image sensor such as a CCD sensor or a CMOS sensor provided in the image pickup apparatus or a film plane (photosensitive surface) of a silver film. IS represents a shift lens unit (image stabilizing lens unit) movable in a direction orthogonal to the optical axis (indicated by a solid line in FIG. 1) of the zoom lens in order to reduce (correct) image blur due to camera or manual shake.

In the zoom lens, a lens unit is a group of one or more lenses that move together during magnification variation (zooming) between a wide-angle end and a telephoto end. That is, a distance between adjacent lens units changes during zooming. The lens unit may include the aperture stop. The wide-angle end and telephoto end are the maximum angle of view (shortest focal length) and the minimum angle of view (maximum focal length), respectively, when the lens unit that moves during zooming is located at both ends of a mechanically or controllably movable range on the optical axis.

Generally, in order to reduce the size of a lens unit, it is necessary to reduce the outer diameter of the lens (effective diameter of the lens). In order to reduce the outer diameter of the lens, the light beam incident on that lens unit is to be sufficiently converged on the light incident side of the lens unit. Thus, a lens unit having strong positive refractive power may be disposed on the object side of the lens unit. In each example, the first lens unit L1 includes one negative lens and two or more positive lenses arranged in order from the object side to the image side. Thereby, the lens unit tends to have strong positive refractive power on the object side.

In each example, all lens units move during zooming, and the lens unit closest to the image plane moves toward the object side during zooming from the wide-angle end to the telephoto end. Since the first lens unit L1 moves toward the object side so that a distance between the first lens unit L1 and the second lens unit L2 becomes larger at the telephoto end than at the wide-angle end, a distance at which the on-axis light beam emitted from the first lens unit L1 converges can be easily secured at the telephoto end where the diameter of the on-axis light beam becomes larger.

Thereby, miniaturization of subsequent lens units becomes easier. Moreover, the overall optical length at the wide-angle end can be easily reduced.

In each example, the lens unit closest to the image plane in the rear group moves toward the object side during zooming from the wide-angle end to the telephoto end. Thereby, a peripheral light amount at the telephoto end can be easily secured, which tends to be a problem with a zoom lens with a bright F-number.

In each example, the following inequalities are satisfied:

$$10.0 \leq R1r/fw \leq 25.0 \tag{1}$$

$$0.2 \leq mL1/f1 \leq 0.7 \tag{2}$$

where $R1r$ is a radius of curvature of the lens surface closest to the image plane of the first lens unit L1, $fw$ is a focal length of the zoom lens at the wide-angle end, $mL1$ is a moving amount of the first lens unit L1 from the wide-angle end to the telephoto end, and $f1$ is a focal length of the first lens unit L1. The moving amount of the lens unit is a positive moving amount in a case where the lens unit is closer to the object at the telephoto end than at the wide-angle end, and a negative moving amount in a case where the lens unit is closer to the image plane at the telephoto end than at the wide-angle end.

Inequality (1) defines a proper range of the radius of curvature $R1r$ of the lens surface closest to the image plane of the first lens unit L1 relative to the focal length $fw$ of the zoom lens at the wide-angle end. The zoom lens according to each example achieves both a wide angle of view and a high zoom ratio by allowing a barrel-shaped distortion amount to some extent at the wide-angle end. By increasing $R1r$, the refractive power of the first lens unit L1 can be strengthened, and a high zoom ratio can be achieved. In a case where $R1r$ becomes too large so that $R1r/fw$ becomes higher than the upper limit of inequality (1), distortion at the wide-angle end becomes too large. As a result, in electronically correcting distortion in image data obtained through the image sensor, the correction amount becomes too large, and it becomes difficult to secure resolution in a peripheral area at the wide-angle end. In a case where $R1r$ becomes too small so that $R1r/fw$ becomes lower than the lower limit of inequality (1), the refractive power of the first lens unit L1 cannot be made strong and it becomes difficult to achieve a high zoom ratio. Further, it becomes difficult to correct curvature of field at the wide-angle end.

Inequality (2) defines a proper relationship between the focal length $f1$ of the first lens unit L1 and the moving amount $mL1$ of the first lens unit L1 during zooming. Satisfying inequality (2) can achieve a high zoom ratio, and easily correct spherical aberration and chromatic aberration of magnification at the telephoto end. As a result, various aberrations are less likely to fluctuate small over the entire zoom range, and high optical performance can be acquired over the entire image plane. In a case where $mL1$ becomes too small so that $mL1/f1$ becomes higher than the upper limit of inequality (2), it becomes difficult to correct spherical aberration and lateral chromatic aberration at the telephoto end. In a case where $mL1$ becomes too small so that $mL1/f1$ becomes lower than the lower limit of inequality (2), it becomes difficult to reduce the overall optical length at the wide-angle end and to achieve a high zoom ratio.

Satisfying the conditions of inequalities (1) and (2) can provide a zoom lens with a compact size, a bright F-number over the entire zoom range, and high optical performance at a high zoom ratio.

Inequalities (1) and (2) may be replaced with the following inequalities (1a) and (2a):

$$12.0 \le R1r/fw \le 22.0 \tag{1a}$$

$$0.25 \le mL1/f1 \le 0.60 \tag{2a}$$

Inequalities (1) and (2) may be replaced with the following inequalities (1b) and (2b):

$$12.5 \le R1r/fw \le 21.5 \tag{1b}$$

$$0.27 \le mL1/f1 \le 0.57 \tag{2b}$$

The zoom lens according to each example may satisfy at least one of the following inequalities (3) to (15). nd1p is an average value of the refractive index for the d-line of one or more positive lenses included in the first lens unit L1. vd1n is an Abbe number based on the d-line of the negative lens included in the first lens unit L1. R2r is a radius of curvature of a lens surface on the image side of the negative lens closest to the object in the second lens unit L2, and f2 is a focal length of the second lens unit L2. f1 is a focal length of the first lens unit L1, ft is a focal length of the zoom lens at the telephoto end, and f1n is a focal length of the negative lens of the first lens unit L1. Among one or more negative lenses included in the second lens unit L2, vd2n is an Abbe number of the negative lens having the largest Abbe number based on the d-line. skw is a back focus of the zoom lens at the wide-angle end, and skt is a back focus of the zoom lens at the telephoto end. mL1 is a moving amount of the first lens unit L1 during zooming from the wide-angle end to the telephoto end, and mL3 is a moving amount of the third lens unit L3 during zooming from the wide-angle end to the telephoto end. Fnot is an F-number of the zoom lens at the telephoto end, and hsp is an effective diameter of the aperture stop SP at the telephoto end. The effective diameter is the maximum diameter of an area in the aperture stop SP or lens, through which light rays contributing to imaging pass. R2r is a radius of curvature of a lens surface on the image side of the negative lens closest to the object in the second lens unit L2.

$$1.55 \le nd1p \le 1.75 \tag{3}$$

$$20 \le vd1n \le 30 \tag{4}$$

$$0.8 \le |R2r/f2| \le 1.2 \tag{5}$$

$$0.6 \le f1/ft \le 1.7 \tag{6}$$

$$0.7 \le |f2/fw| \le 10 \tag{7}$$

$$4.4 \le |f1/f2| \le 6.0 \tag{8}$$

$$1.2 \le |f1n/f1| \le 2.3 \tag{9}$$

$$60 \le vd2n \le 100 \tag{10}$$

$$1.1 \le |f2/skw| \le 2.2 \tag{11}$$

$$1.8 \le f1/skt \le 3.6 \tag{12}$$

-continued $$1.2 \le mL1/mL3 \le 2.2 \tag{13}$$

$$0.6 \le fnot \times hsp/ft \le 1.1 \tag{14}$$

$$1.00 \le (R1r + R2r)/(R1r - R2r) \le 1.25 \tag{15}$$

Inequality (3) defines a proper range of the average value nd1p of the refractive index of one or more positive lenses included in the first lens unit L1. Satisfying inequality (3) can achieve both miniaturization of the first lens unit L1 and high performance of the zoom lens. In a case where the average value of the refractive index of the positive lens becomes too high so that nd1p becomes higher than the upper limit of inequality (3), the positive lens has high dispersion. As a result, it becomes difficult to correct chromatic aberration within the first lens unit L1, and longitudinal chromatic aberration and lateral chromatic aberration at the telephoto end increase. In a case where the average value of the refractive index of the positive lens becomes too low so that nd1p becomes lower than the lower limit of inequality (3), it becomes difficult to reduce the size of the first lens unit L1 and reduce the overall length of the zoom lens (overall lens length).

Inequality (4) defines a proper range of the Abbe number vd1n of the negative lens of the first lens unit L1. Satisfying inequality (4) can satisfactorily correct chromatic aberration. In a case where vd1n becomes higher than the upper limit of inequality (4), the chromatic aberration generated in the first lens unit L1 becomes too large. As a result, it becomes difficult to correct longitudinal chromatic aberration and lateral chromatic aberration at the telephoto end. In a case where vd1n becomes lower than the lower limit of inequality (4), the second-order dispersion of the negative lens becomes large, and it becomes difficult to correct lateral chromatic aberration at the wide-angle end.

Inequality (5) defines a proper range of the radius of curvature R2r of the lens surface on the image side of the negative lens closest to the object in the second lens unit L2 relative to the focal length f2 of the second lens unit L2. Satisfying inequality (5) can achieve both a wide angle of view and high performance. In a case where R2r becomes too large so that |R2r/f2| becomes higher than the upper limit of inequality (5), distortion at the wide-angle end becomes too large. As a result, in electronically correcting distortion in image data obtained through the image sensor, the correction amount becomes too large, and it becomes difficult to secure resolution in a peripheral area at the wide-angle end. In a case where R2r becomes too small so that R2r/f2| becomes lower than the lower limit of inequality (5), it becomes difficult to correct the curvature of field at the wide-angle end. Inequality (6) defines a proper range of the focal length f1 of the first lens unit L1 relative to the focal length ft of the zoom lens at the telephoto end. In a case where f1 becomes too large (the positive refractive power of the first lens unit L1 becomes weaker) so that f1/ft becomes higher than the upper limit of inequality (6), the moving amount of the first lens unit L1 increases for zooming and consequently the overall lens length becomes longer at the telephoto end. Further, it becomes difficult to reduce the effective diameter of the first lens unit L1. In a case where f1 becomes too small (the positive refractive power of the first lens unit L1 becomes stronger) so that f1/ft becomes lower than the lower limit of inequality (6), it becomes easy to achieve a high zoom ratio, but it becomes difficult to correct the spherical surface at the telephoto end.

Inequality (7) defines a proper range of the focal length f2 of the second lens unit L2 relative to the focal length fw of the zoom lens at the wide-angle end. Satisfying inequality (7) can easily achieve a retrofocus type refractive power arrangement at the wide-angle end. As a result, a wide angle of view can be realized at the wide-angle end, and high optical performance can be obtained over the entire image plane while fluctuations can be reduced in various aberrations over the entire zoom range. In a case where f2 becomes too large (the negative refractive power of the second lens unit L2 becomes weaker) so that |f2/fw| becomes higher than the upper limit of inequality (7), it becomes difficult to achieve a retrofocus type refractive power arrangement and to widen the angle of view at the wide-angle end. In a case where f2 becomes too small (the negative refractive power of the second lens unit L2 becomes stronger) so that |f2/fw| becomes lower than the lower limit of inequality (7), it becomes difficult to reduce fluctuations in spherical aberration and lateral chromatic aberration due to zooming.

Inequality (8) defines a proper range of the ratio of the focal length f1 of the first lens unit L1 to the focal length f2 of the second lens unit L2. In a case where the positive refractive power of the first lens unit L1 becomes too weak so that |f1/f2| becomes higher than the upper limit of inequality (8), the moving amount of the first lens unit L1 for zooming becomes large, and consequently the overall lens length becomes longer at the telephoto end. Furthermore, it becomes difficult to reduce the effective diameter of the first lens unit L1. In a case where the positive refractive power of the first lens unit L1 becomes too strong so that |f1/f2| becomes lower than the lower limit of inequality (8), it becomes easy to achieve a high zoom ratio, but it becomes difficult to correct spherical aberration at the telephoto end.

Inequality (9) defines a proper range of the focal length f1n of the negative lens included in the first lens unit L1 relative to the focal length f1 of the first lens unit L1. In a case where the refractive power of the negative lens in the first lens unit L1 becomes too weak so that |f1n/f1| becomes higher than the upper limit of inequality (9), it becomes difficult to correct longitudinal chromatic aberration and lateral chromatic aberration at the telephoto end. In a case where the refractive power of the negative lens of the first lens unit L1 becomes too strong so that |f1 n/f1| becomes lower than the lower limit of inequality (9), it becomes difficult to correct distortion at the wide-angle end.

Inequality (10) defines a proper range of the Abbe number vd2n of the negative lens with the largest Abbe number in the second lens unit L2. In a case where vd2n becomes higher than the upper limit of inequality (10), the refractive index of the negative lens becomes extremely low, and it becomes difficult to correct curvature of field at the wide-angle end. In a case where vd2n becomes lower than the lower limit of inequality (10), it becomes difficult to correct lateral chromatic aberration at the wide-angle end.

Inequality (11) defines a proper range of the focal length f2 of the second lens unit L2 relative to the back focus skw at the wide-angle end. Satisfying inequality (11) can easily achieve a retrofocus type refractive power arrangement at the wide-angle end and a wide angle of view at the wide-angle end, and suppress fluctuations in various aberrations over the entire zoom range. Thereby, high optical performance can be realized over the entire image plane. In a case where the negative refractive power of the second lens unit L2 becomes weaker so that |f2/skw| becomes higher than the upper limit of inequality (11), it becomes difficult to achieve a retrofocus type refractive power arrangement and a wide angle of view at the wide-angle end. In a case where the negative refractive power of the second lens unit L2 becomes too strong so that |f2/skw| becomes lower than the lower limit of inequality (11), it becomes difficult to reduce fluctuations in spherical aberration and lateral chromatic aberration associated with zooming.

Inequality (12) defines a proper range of the focal length f1 of the first lens unit L1 relative to the back focus skt at the telephoto end. In a case where the positive refractive power of the first lens unit L1 becomes too weak so that f1/skt becomes higher than the upper limit of inequality (12), the moving amount of the first lens unit L1 becomes larger for zooming. As a result, the overall lens length becomes longer at the telephoto end. Further, it becomes difficult to reduce the effective diameter of the first lens unit L1. In a case where the positive refractive power of the first lens unit L1 becomes too strong so that f1/skt becomes lower than the lower limit of inequality (12), it becomes easy to achieve a high zoom ratio, but it becomes difficult to correct spherical aberration at the telephoto end.

Inequality (13) defines a proper relationship between the moving amount mL1 of the first lens unit L1 from the wide-angle end to the telephoto end and the moving amount mL3 of the third lens unit L3 from the wide-angle end to the telephoto end. In a case where mL1 becomes too large so that mL1/mL3 becomes higher than the upper limit of inequality (13), it becomes difficult to correct spherical aberration and lateral chromatic aberration at the telephoto end. In a case where mL1 becomes too small so that mL1/mL3 becomes lower than the lower limit of inequality (13), it becomes difficult to secure a reduced overall lens length at the wide-angle end and a high zoom ratio.

Inequality (14) defines a proper range of the effective diameter hsp of the aperture stop SP at the telephoto end. Satisfying inequality (14) can reduce the size of the zoom lens in the radial direction. Inequality (14) can be easily satisfied by satisfying inequalities (1) to (13), especially inequality (8). In a case where hsp becomes too large so that fnot×hsp/ft becomes higher than the upper limit of inequality (14), it becomes difficult to reduce the size of the zoom lens in the radial direction. In a case where hsp becomes too small so that fnot×hsp/ft becomes lower than the lower limit of inequality (14), the power arrangement causes the refractive power of the first lens unit L1 to be too strong, and it becomes difficult to correct longitudinal chromatic aberration and spherical aberration at the telephoto end.

Inequality (15) defines a proper shape of an air lens between the first lens unit L1 and the second lens unit L2. In a case where the positive refractive power of the air lens becomes too strong so that (R1r+R2r)/(R1r-R2r) becomes higher than the upper limit of inequality (15), it becomes difficult to correct curvature of field at the wide-angle end. In a case where the positive refractive power of the air lens becomes too strong so that (R1r+R2r)/(R1r-R2r) becomes lower than the lower limit of inequality (15), it becomes difficult to correct distortion at the wide-angle end.

In each example, the second lens unit L2 may include four or more lenses. Thereby, the refractive power of the second lens unit L2 can be properly set, and a compact zoom lens having a high zoom ratio can be easily acquired.

Inequalities (3) to (15) may be replaced with the following inequalities (3a) to (15a):

$$1.58 \leq nd1p \leq 1.72 \qquad (3a)$$

$$23 \leq vd1n \leq 26 \qquad (4a)$$

-continued $$0.85 \le |R2r/f2| \le 1.15 \tag{5a}$$

$$0.7 \le f1/ft \le 1.6 \tag{6a}$$

$$0.75 \le |f2/fw| \le 0.95 \tag{7a}$$

$$4.6 \le |f1/f2| \le 5.8 \tag{8a}$$

$$1.3 \le |f1n/f1| \le 2.2 \tag{9a}$$

$$65 \le vd2n \le 80 \tag{10a}$$

$$1.3 \le |f2/skw| \le 2.0 \tag{11a}$$

$$2.0 \le f1/skt \le 3.4 \tag{12a}$$

$$1.4 \le mL1/mL3 \le 2.0 \tag{13a}$$

$$0.65 \le fnot \times hsp/ft \le 1.05 \tag{14a}$$

$$1.05 \le (R1r + R2r)/(R1r - R2r) \le 1.20 \tag{15a}$$

Inequalities (3) to (15) may be replaced with the following inequalities (3b) to (15b):

$$1.60 \le nd1p \le 1.70 \tag{3b}$$

$$23.5 \le vd1n \le 25.0 \tag{4b}$$

$$0.88 \le |R2r/f2| \le 1.10 \tag{5b}$$

$$0.75 \le f1/ft \le 1.57 \tag{6b}$$

$$0.80 \le |f2/fw| \le 0.92 \tag{7b}$$

$$4.75 \le |f1/f2| \le 5.70 \tag{8b}$$

$$1.35 \le |f1n/f1| \le 2.15 \tag{9b}$$

$$66 \le vd2n \le 70 \tag{10b}$$

$$1.4 \le |f2/skw| \le 1.9 \tag{11b}$$

$$2.1 \le f1/skt \le 3.3 \tag{12b}$$

$$1.45 \le mL1/mL3 \le 1.95 \tag{13b}$$

$$0.66 \le fnot \times hsp/ft \le 1.02 \tag{14b}$$

$$1.08 \le (R1r + R2r)/(R1r - R2r) \le 1.15 \tag{15b}$$

Examples 1 to 5 will be explained in detail below. FIGS. 1, 4, 7, 10, and 13 respectively illustrate the configurations of the zoom lenses according to Examples 1, 2, 3, 4, and 5 in an in-focus state on an object at infinity at the wide-angle end.

The zoom lens according to Example 1 illustrated in FIG. 1 includes, in order from the object side to the image side, a first lens unit L1 having positive refractive power, a second lens unit L2 having negative refractive power, a third lens unit L3 having positive refractive power, a fourth lens unit L4 having negative refractive power, a fifth lens unit L5 having positive refractive power, a sixth lens unit L6 having negative refractive power, and a seventh lens unit L7 having negative refractive power.

In Example 1, during zooming from the wide-angle end to the telephoto end, each lens unit moves toward the object side as illustrated by an arrow below. At this time, a distance between the first lens unit L1 and the second lens unit L2 increases, a distance between the second lens unit L2 and the third lens unit L3 decreases, and a distance between the third lens unit L3 and the fourth lens unit L4 increases. A distance between the fourth lens unit L4 and the fifth lens unit L5 decreases, a distance between the fifth lens unit L5 and the sixth lens unit L6 decreases, and a distance between the sixth lens unit L6 and the seventh lens unit L7 increases. The third lens unit L3, the fifth lens unit L5, and the seventh lens unit L7 move together. For focusing from an object at infinity to an object at a short distance, the sixth lens unit L6 moves toward the image side as illustrated by an arrow in FIG. 1.

Figure 4:
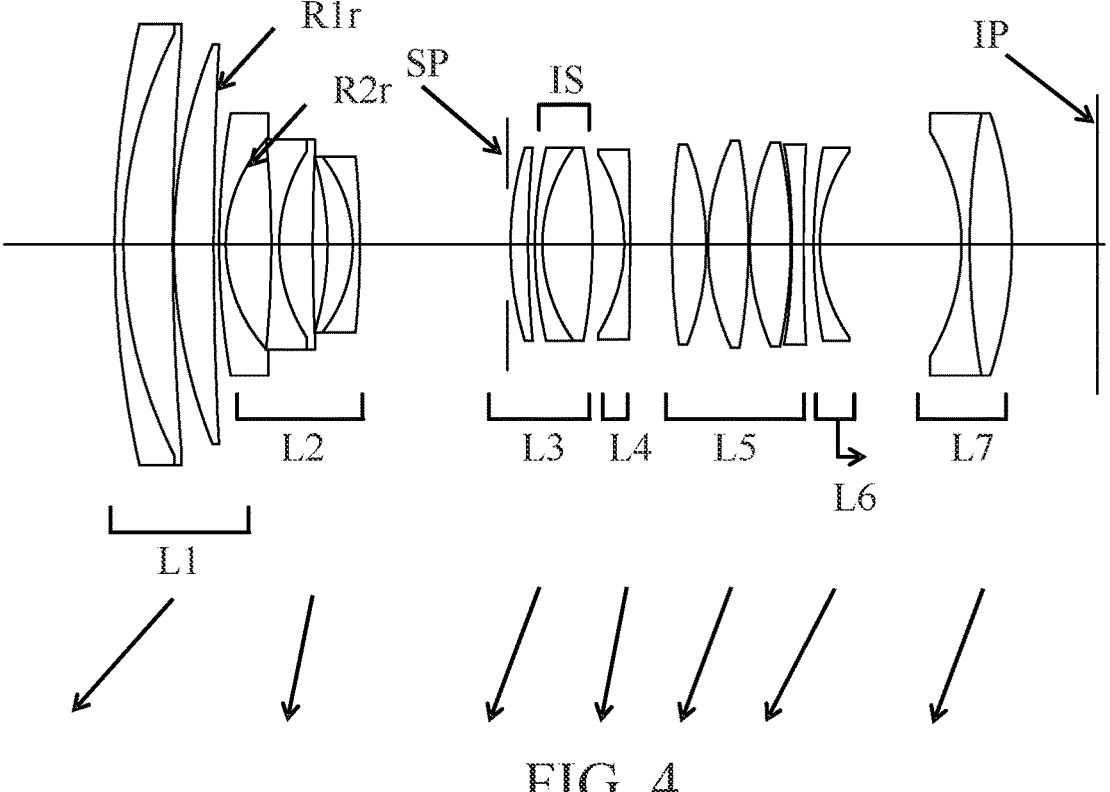
FIG. 4 is a sectional view illustrating the configuration of a zoom lens according to Example 2.
Figure 5:
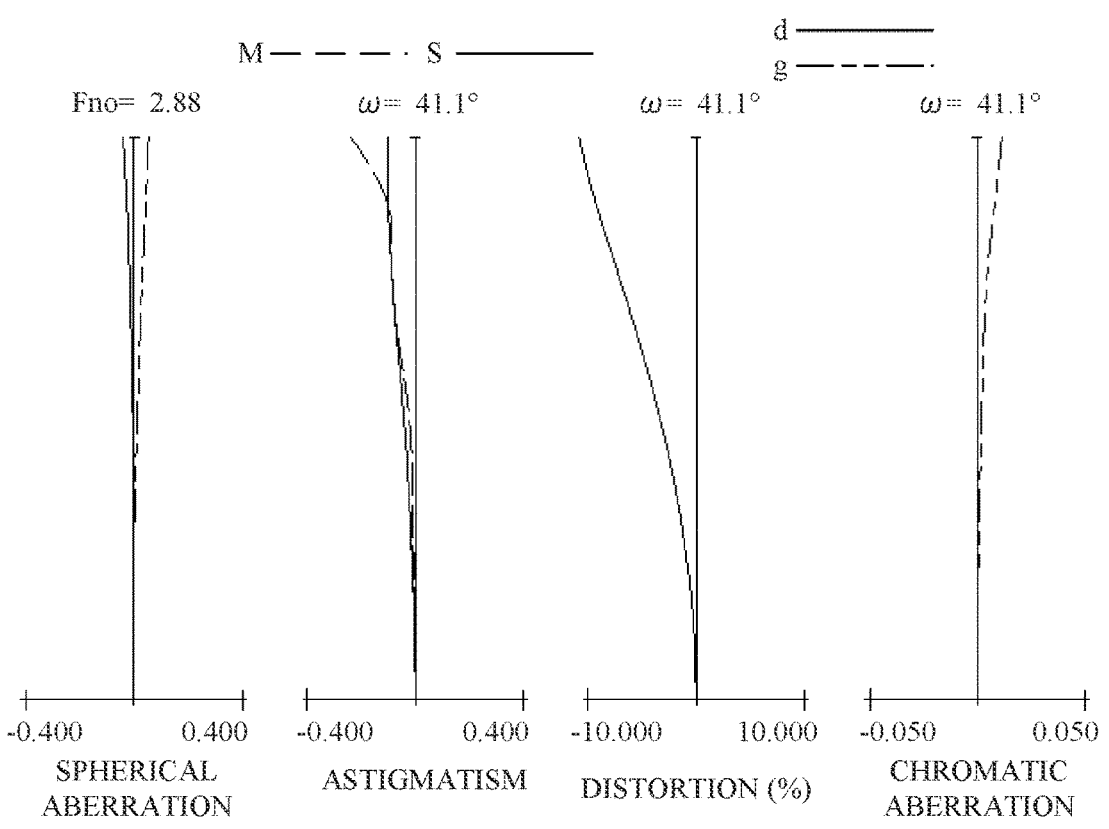
FIG. 5 is a longitudinal aberration diagram of the zoom lens according to Example 2 at a wide-angle end.
Figure 6:
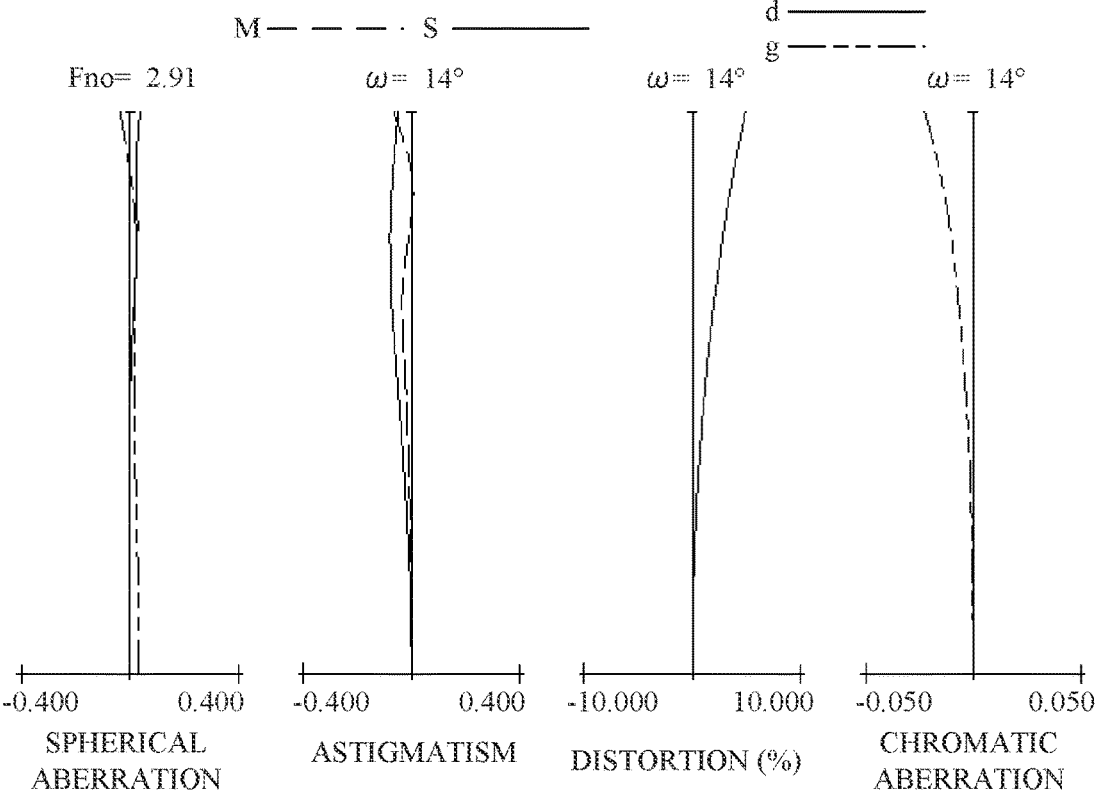
FIG. 6 is a longitudinal aberration diagram of the zoom lens according to Example 2 at a telephoto end.

The zoom lens according to Example 2 illustrated in FIG. 4 includes, in order from the object side to the image side, a first lens unit L1 having positive refractive power, a second lens unit L2 having negative refractive power, a third lens unit L3 having positive refractive power, a fourth lens unit L4 having negative refractive power, a fifth lens unit L5 having positive refractive power, a sixth lens unit L6 having negative refractive power, and a seventh lens unit L7 having positive refractive power.

In Example 2, during zooming from the wide-angle end to the telephoto end, each lens unit moves toward the object side as illustrated by an arrow below. At this time, a distance between the first lens unit L1 and the second lens unit L2 increases, a distance between the second lens unit L2 and the third lens unit L3 decreases, and a distance between the third lens unit L3 and the fourth lens unit L4 increases. A distance between the fourth lens unit L4 and the fifth lens unit L5 decreases, a distance between the fifth lens unit L5 and the sixth lens unit L6 decreases, and a distance between the sixth lens unit L6 and the seventh lens unit L7 increases. The third lens unit L3 and the fifth lens unit L5 move together. For focusing from an object at infinity to an object at a short distance, the sixth lens unit L6 moves toward the image side as illustrated by an arrow in FIG. 4.

Figures 7, 8:
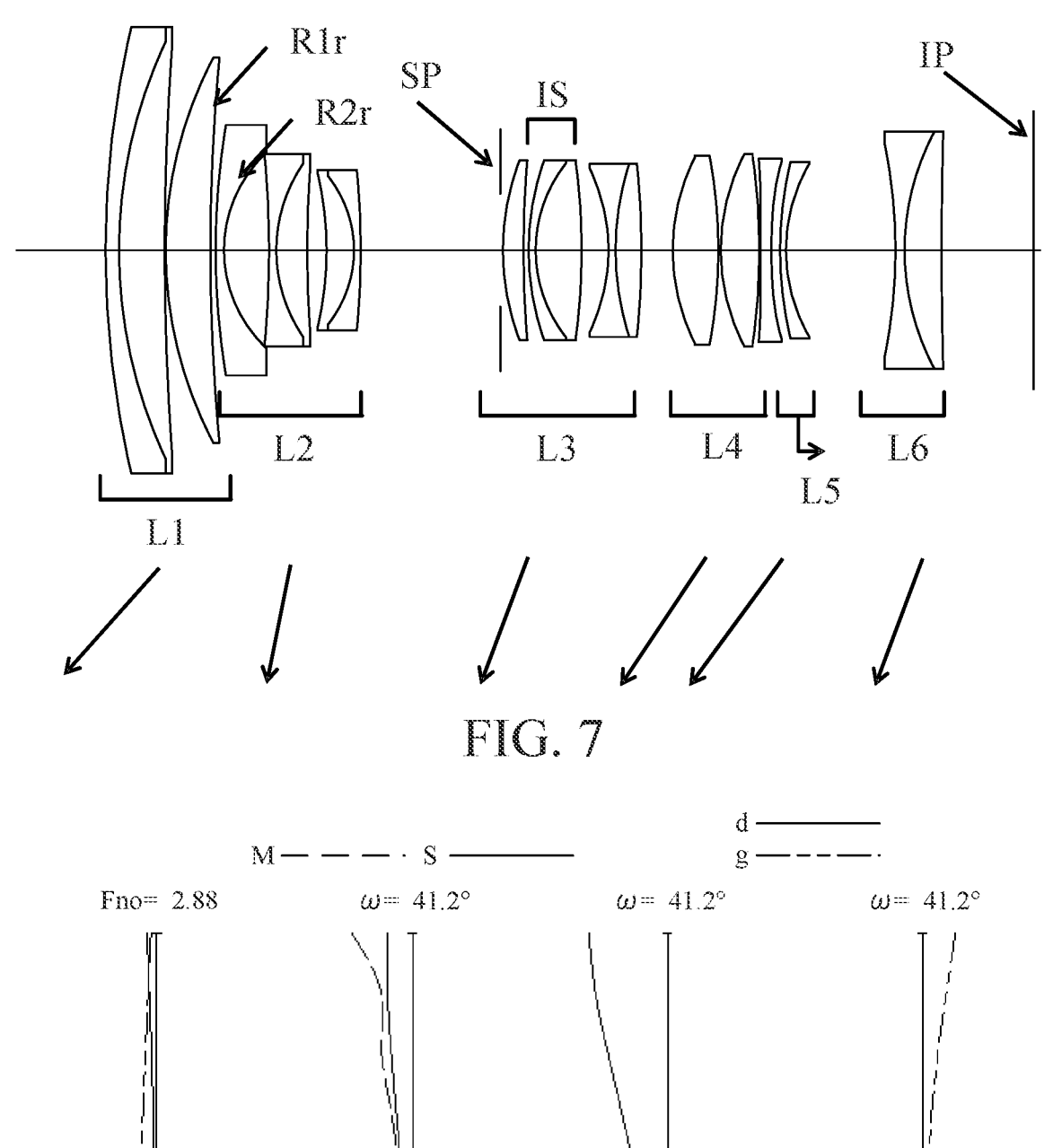
FIG. 7 is a sectional view illustrating the configuration of a zoom lens according to Example 3.
FIG. 8 is a longitudinal aberration diagram of the zoom lens according to Example 3 at a wide-angle end.
Figure 9:
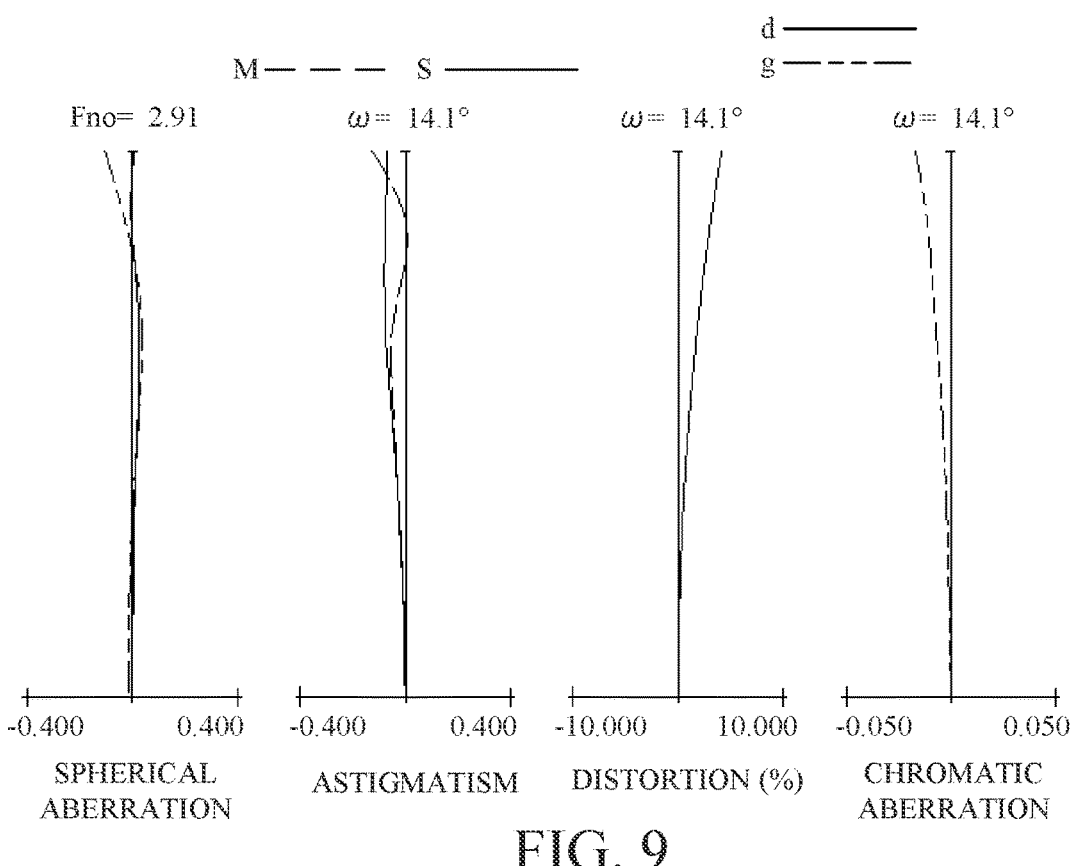
FIG. 9 is a longitudinal aberration diagram of the zoom lens according to Example 3 at a telephoto end.
Figure 10:
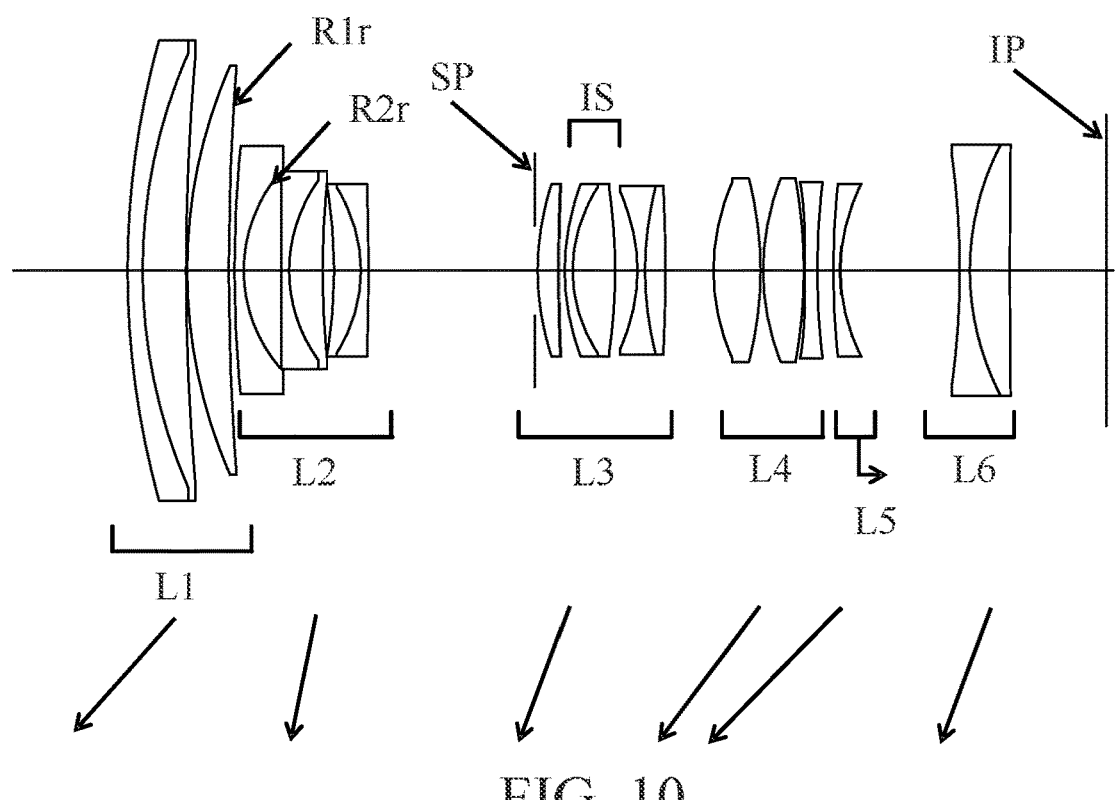
FIG. 10 is a sectional view illustrating the configuration of a zoom lens according to Example 4.
Figure 11:
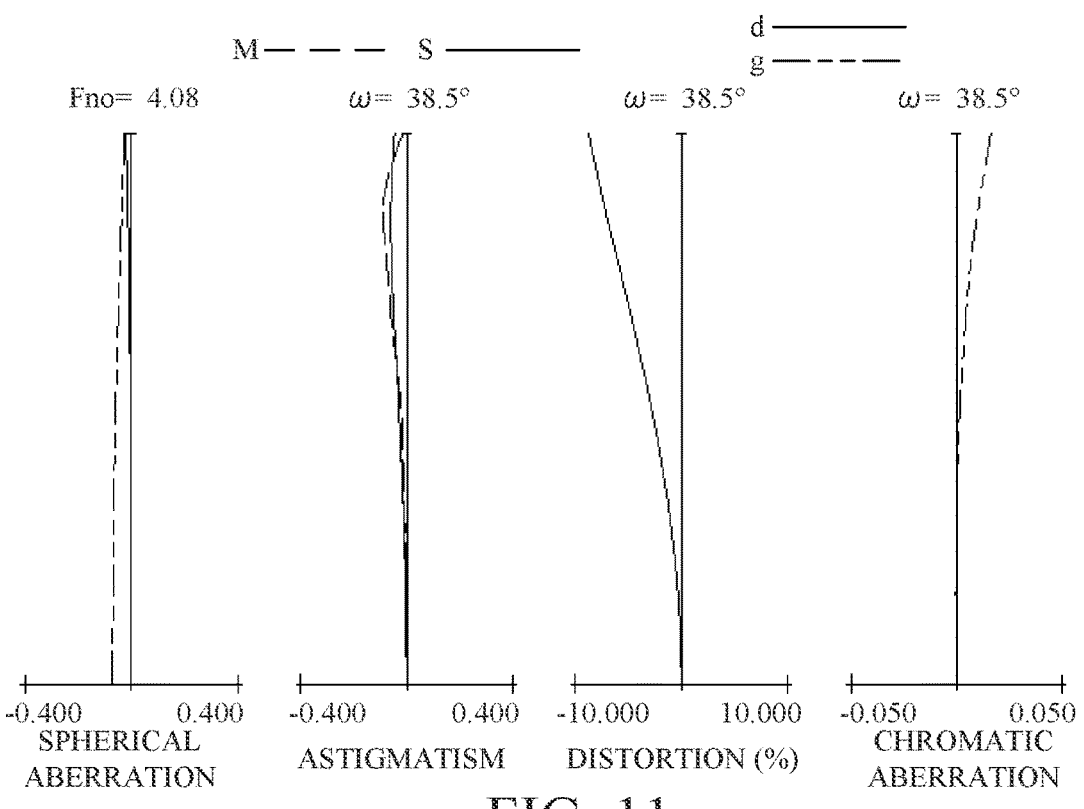
FIG. 11 is a longitudinal aberration diagram of the zoom lens according to Example 4 at a wide-angle end.
Figure 12:
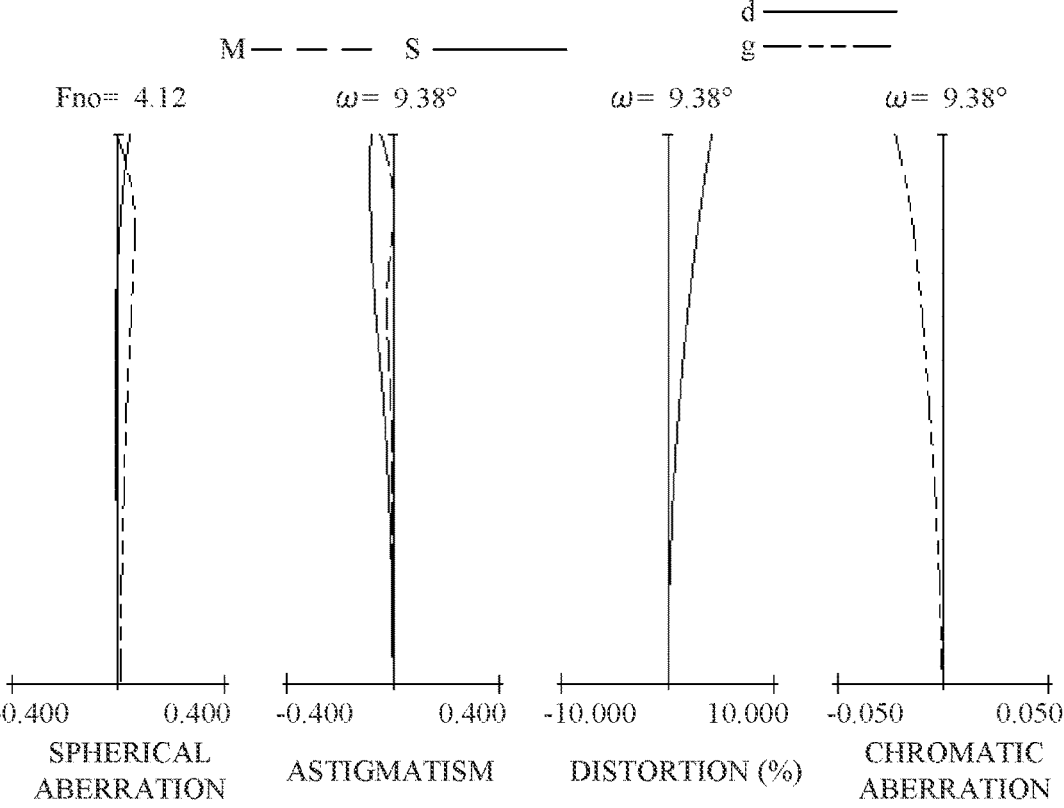
FIG. 12 is a longitudinal aberration diagram of the zoom lens according to Example 4 at a telephoto end.

Each of the zoom lenses according to Example 3 illustrated in FIG. 7 and Example 4 illustrated in FIG. 10 include, in order from the object side to the image side, a first lens unit L1 having positive refractive power, a second lens unit L2 having negative refractive power, a third lens unit L3 having positive refractive power, a fourth lens unit L4 having positive refractive power, a fifth lens unit L5 having negative refractive power, and a sixth lens unit L6 having positive refractive power.

In Examples 3 and 4, during zooming from the wide-angle end to the telephoto end, each lens unit moves toward the object side as illustrated by an arrow below. At this time, a distance between the first lens unit L1 and the second lens unit L2 increases, a distance between the second lens unit L2 and the third lens unit L3 decreases, and a distance between the third lens unit L3 and the fourth lens unit L4 decreases. A distance between the fourth lens unit L4 and the fifth lens unit L5 decreases, and a distance between the fifth lens unit L5 and the sixth lens unit L6 increases. The third lens unit L3 and the sixth lens unit L6 move together. For focusing from an object at infinity to an object at a short distance, the fifth lens unit L5 moves toward the image side as illustrated by an arrow in FIGS. 7 and 10.

Figures 13, 14:
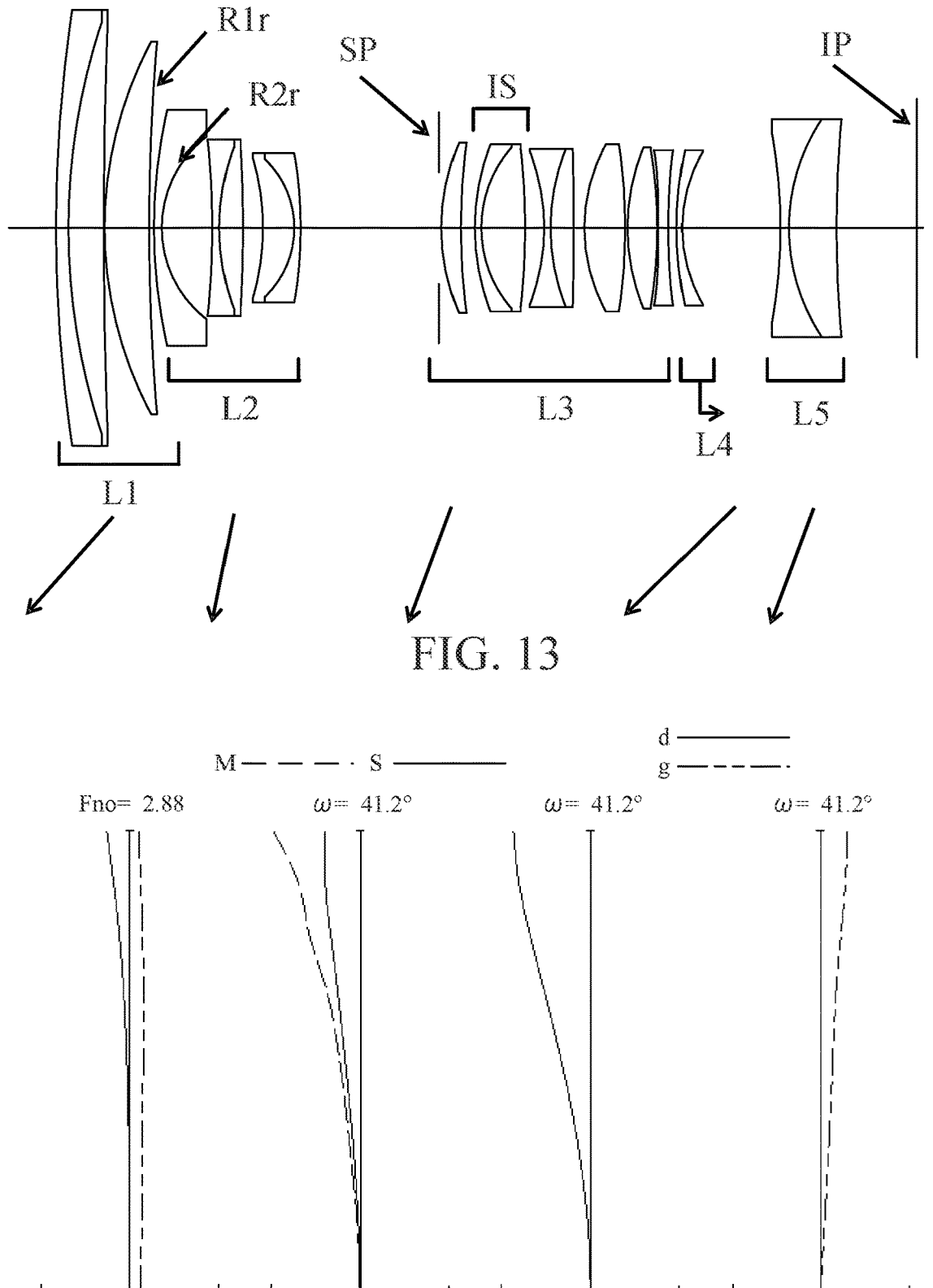
FIG. 13 is a sectional view illustrating the configuration of a zoom lens according to Example 5.
FIG. 14 is a longitudinal aberration diagram of the zoom lens according to Example 5 at a wide-angle end.
Figure 15:
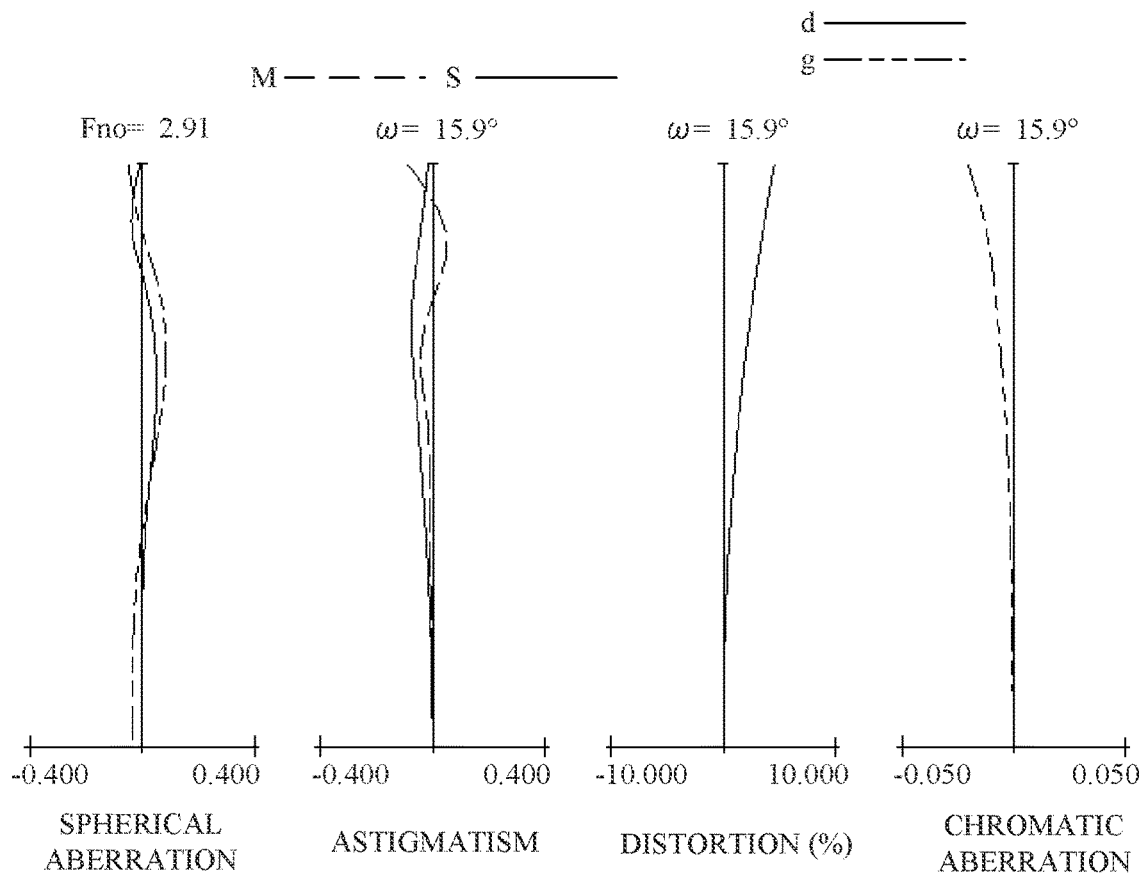
FIG. 15 is a longitudinal aberration diagram of the zoom lens according to Example 5 at a telephoto end.

The zoom lens according to Example 5 illustrated in FIG. 13 includes, in order from the object side to the image side, a first lens unit L1 having positive refractive power, a second lens unit L2 having negative refractive power, a third lens unit L3 having positive refractive power, a fourth lens unit L4 having negative refractive power, and a fifth lens unit L5 having positive refractive power.

In Example 5, during zooming from the wide-angle end to the telephoto end, each lens unit moves toward the object side as illustrated by an arrow below. At this time, a distance between the first lens unit L1 and the second lens unit L2 increases, a distance between the second lens unit L2 and the third lens unit L3 decreases, and a distance between the third lens unit L3 and the fourth lens unit L4 decreases. A distance between the fourth lens unit L4 and the fifth lens unit L5 increases. For focusing from an object at infinity to an object at a short distance, the fourth lens unit L4 moves toward the image side as illustrated by an arrow in FIG. 13.

In each example, the aperture stop SP is disposed closest to the object in the third lens unit L3. The shift lens unit IS is provided as a part (partial lens unit) of the third lens unit L3.

Focusing may be performed by moving the entire zoom lens or any one lens unit.

Numerical examples 1 to 5 corresponding to Examples 1 to 5 are illustrated below. In each numerical example, a surface number i represents the order of the surfaces when counted from the object side. r represents a radius of curvature of the i-th surface from the object side (mm), d represents a lens thickness or air gap (mm) between i-th and (i+1)-th surfaces, and nd represents a refractive index for the d-line of the optical material. vd represents an Abbe number based on the d-line of the optical material between the i-th and (i+1)-th surfaces. The Abbe number of a certain material is represented as follows:

$$vd = (Nd - 1)/(NF - NC)$$

where Nd, NF, and NC are refractive indexes of the d-line (587.6 nm), F-line (486.1 nm), and C-line (656.3 nm) in the Fraunhofer line. As described above, the effective diameter is the maximum diameter of the area through which light rays contributing to imaging in the lens or aperture stop pass.

BF represents a back focus (mm). The back focus is the distance on the optical axis from the final surface (lens surface closest to the image plane) of the zoom lens to the paraxial image surface, expressed as an air-equivalent length. BF at the wide-angle end corresponds to skw in inequality (11), and BF at the telephoto end corresponds to skt in inequality (12). The overall lens length is a distance on the optical axis from the front surface (lens surface closest to the object) to the final surface of the zoom lens plus the back focus.

An asterisk "*" attached to the right side of a surface number means that the optical surface is aspheric. The aspherical shape is expressed as follows:

$$x = (h^2/R)/\left[1 + \left\{1 - (1+k)(h/R)^2\right\}^{1/2}\right] + A4 \times h^4 + A6 \times h^6 + A8 \times h^8 + A10 \times h^{10} + A12 \times h^{12}$$

where x is a displacement amount from the surface vertex in the optical axis direction, h is a height from the optical axis in the direction perpendicular to the optical axis, R is a paraxial radius of curvature, k is a conical constant, and A4, A6, A8, A10, and A12 are aspherical coefficients of each order. "e+Z" in each aspherical coefficient means "x10$^{\pm Z}$." WIDE represents the wide-angle end, MIDDLE represents an intermediate (middle) zoom position, TELE represents a telephoto end.

Table 1 summarizes various values corresponding to inequalities (1) to (15) in each numerical example.

FIGS. 2, 5, 8, 11, and 14 respectively illustrate the longitudinal aberration (spherical aberrations, astigmatism, distortion, and chromatic aberration) of the zoom lenses according to numerical examples 1, 2, 3, 4, and 5 in an in-focus state on an object at infinity at the wide-angle end. FIGS. 3, 6, 9, 12, and 15 illustrate the longitudinal aberrations of the zoom lenses according to numerical examples 1, 2, 3, 4, and 5 in an in-focus state on an object at infinity at the telephoto end.

In the spherical aberration diagram, Fno represents an F-number. A solid line indicates a spherical aberration amount for the d-line (wavelength 587.6 nm), and an alternate long and two short dashes line indicates a spherical aberration amount for the g-line (wavelength 435.8 nm). In an astigmatism diagram, S illustrates an astigmatism amount on a sagittal image plane, and M illustrates an astigmatism amount on a meridional image surface. A distortion diagram illustrates a distortion amount for the d-line. A chromatic aberration diagram illustrates a lateral chromatic aberration amount for the g-line. @ is an imaging half angle of view (*).

Numerical Example 1

UNIT: mm

SURFACE DATA

| Surface No. | r | d | nd | vd | Effective Diameter |
|---|---|---|---|---|---|
| 1 | 146.943 | 1.20 | 1.84666 | 23.8 | 51.67 |
| 2 | 76.341 | 5.41 | 1.59522 | 67.7 | 49.25 |
| 3 | 2763.932 | 0.15 | 48.07 | | |
| 4 | 65.022 | 4.64 | 1.59522 | 67.7 | 44.71 |
| 5 | 417.392 | (Variable) | 44.04 | | |
| 6 | 120.904 | 0.95 | 1.88300 | 40.8 | 31.25 |
| 7 | 22.625 | 5.85 | 25.89 | | |
| 8 | −65.433 | 1.10 | 1.59522 | 67.7 | 25.16 |
| 9 | 25.859 | 4.56 | 1.85478 | 24.8 | 22.59 |
| 10 | −215.107 | 1.00 | 21.60 | | |
| 11 | −50.639 | 1.00 | 1.76385 | 48.5 | 21.44 |
| 12* | 333.330 | (Variable) | 20.54 | | |
| 13 (SP) | ∞ | 0.40 | 21.74 | | |
| 14 | 45.875 | 2.83 | 2.00069 | 25.5 | 22.73 |
| 15 | 8581.433 | 2.87 | 22.72 | | |
| 16 | 59.573 | 0.95 | 1.90366 | 31.3 | 22.71 |
| 17 | 28.407 | 4.74 | 1.61772 | 49.8 | 22.31 |
| 18 | −104.849 | (Variable) | 22.18 | | |
| 19* | −23.500 | 0.70 | 2.00069 | 25.5 | 20.54 |
| 20 | 3399.386 | (Variable) | 21.42 | | |
| 21 | 24.526 | 1.10 | 1.77047 | 29.7 | 24.02 |
| 22 | 19.682 | 9.08 | 1.53775 | 74.7 | 24.00 |
| 23 | −48.073 | 0.15 | 24.78 | | |
| 24* | 29.347 | 5.32 | 1.59522 | 67.7 | 25.08 |
| 25* | −67.001 | (Variable) | 24.63 | | |
| 26 | 67.840 | 0.90 | 1.72916 | 54.7 | 23.97 |
| 27 | 25.927 | (Variable) | 23.35 | | |
| 28 | −26.737 | 0.90 | 1.61340 | 44.3 | 28.51 |
| 29 | 241.157 | 4.41 | 1.92286 | 20.9 | 32.19 |
| 30 | −60.028 | (Variable) | 33.01 | | |
| Image Plane | ∞ | | | | |

ASPHERIC DATA

12th Surface
K = 0.00000e+00 A 4 = 2.05926e−06 A 6 = −6.49256e−09
A 8 = 1.43475e−10 A10 = −8.63706e−13 A12 = 1.72787e−15
19th Surface
K = 0.00000e+00 A 4 = 1.16892e−05 A 6 = 2.31044e−09
A 8 = 1.65677e−10 A10 = −1.02280e−12 A12 = 2.07510e−15
24th Surface
K = 0.00000e+00 A 4 = −1.45679e−05 A 6 = −5.25478e−09
A 8 =2.83437e−11 A10 = −1.22675e−12 A12 = 3.90918e−15
25th Surface
K = 0.00000e+00 A 4 = 2.43470e−05 A 6 = −7.83170e−09
A 8 = 1.13711e−10 A10 = −1.31430e−12 A12 = 6.33455e−15

-continued

| UNIT: mm | | | |
|---|---|---|---|
| VARIOUS DATA ZOOM RATIO 5.30 | | | |
| | WIDE | MIDDLE | TELE |
| Focal Length | 24.72 | 71.00 | 130.99 |
| Fno | 4.08 | 4.08 | 4.12 |
| Half Angle of View (°) | 37.84 | 16.95 | 9.38 |
| Image Height | 19.20 | 21.64 | 21.64 |
| Overall Lens Length | 127.91 | 155.41 | 182.91 |
| BF | 11.19 | 31.28 | 47.32 |
| d 5 | 0.80 | 24.07 | 38.64 |
| d12 | 21.36 | 5.50 | 2.38 |
| d18 | 3.56 | 6.70 | 8.25 |
| d20 | 5.67 | 2.53 | 0.98 |
| d25 | 2.65 | 3.93 | 1.32 |
| d27 | 22.48 | 21.20 | 23.81 |
| d30 | 11.19 | 31.28 | 47.32 |

| LENS UNIT DATA | | |
|---|---|---|
| Lens Unit | Starting Surface | Focal Length |
| 1 | 1 | 100.54 |
| 2 | 6 | −20.88 |
| 3 | 13 | 31.96 |
| 4 | 19 | −23.32 |
| 5 | 21 | 18.82 |
| 6 | 26 | −58.08 |
| 7 | 28 | −188.38 |

Numerical Example 2

| UNIT: mm | | | | | |
|---|---|---|---|---|---|
| SURFACE DATA | | | | | |
| Surface No. | r | d | nd | vd | Effective Diameter |
| 1 | 143.158 | 1.30 | 1.85478 | 24.8 | 61.96 |
| 2 | 67.213 | 7.12 | 1.72916 | 54.7 | 58.97 |
| 3 | 353.144 | 0.15 | | | 58.31 |
| 4 | 77.266 | 5.75 | 1.65160 | 58.5 | 55.64 |
| 5 | 529.057 | (Variable) | | | 54.75 |
| 6 | 108.525 | 0.95 | 1.88300 | 40.8 | 36.26 |
| 7 | 22.621 | 6.62 | | | 29.24 |
| 8 | −142.122 | 1.10 | 1.59522 | 67.7 | 28.53 |
| 9 | 24.900 | 4.83 | 1.85478 | 24.8 | 25.27 |
| 10 | 276.056 | 2.16 | | | 24.13 |
| 11 | −43.571 | 3.63 | 1.67300 | 38.3 | 23.79 |
| 12 | −20.609 | 1.05 | 1.76385 | 48.5 | 23.08 |
| 13* | −122.410 | (Variable) | | | 23.21 |
| 14 (SP) | ∞ | 0.40 | | | 24.85 |
| 15 | 47.388 | 2.54 | 2.00069 | 25.5 | 26.10 |
| 16 | 143.113 | 0.99 | | | 26.06 |
| 17 | 60.050 | 1.10 | 1.76200 | 40.1 | 26.30 |
| 18 | 24.033 | 7.22 | 1.59522 | 67.7 | 25.88 |
| 19 | −74.965 | (Variable) | | | 25.88 |
| 20* | −22.817 | 0.80 | 1.77047 | 29.7 | 24.26 |
| 21 | −702.526 | (Variable) | | | 25.69 |
| 22 | 100.576 | 5.02 | 1.49700 | 81.5 | 26.94 |
| 23 | −39.168 | 0.20 | | | 27.44 |
| 24 | 34.767 | 5.89 | 1.49700 | 81.5 | 27.97 |
| 25 | −85.582 | 0.15 | | | 28.13 |
| 26 | 37.147 | 5.96 | 1.49700 | 81.5 | 28.00 |
| 27 | −70.169 | 0.15 | | | 27.47 |
| 28* | −140.008 | 1.70 | 1.85400 | 40.4 | 27.11 |
| 29* | 663.078 | (Variable) | | | 26.62 |
| 30 | 72.036 | 0.90 | 1.61340 | 44.3 | 26.18 |
| 31 | 23.393 | (Variable) | | | 25.31 |

-continued

| UNIT: mm | | | | | |
|---|---|---|---|---|---|
| 32 | −31.223 | 1.15 | 1.61340 | 44.3 | 30.97 |
| 33 | 105.381 | 6.15 | 2.00330 | 28.3 | 35.23 |
| 34 | −58.257 | (Variable) | 36.00 | | |
| Image Plane | ∞ | | | | |

ASPHERIC DATA

13th Surface
K = 0.00000e+00 A 4 = −3.96303e−07 A 6 = 1.97320e−09
A 8 = −3.78717e−11 A10 = 2.46001e−13 A12 = −6.47364e−16
20th Surface
K = 0.00000e+00 A 4 = 6.30322e−06 A 6 = 1.73174e−08
A 8 = −7.91420e−11 A10 = 5.45680e−13 A12 = −1.21247e−15
28th Surface
K = 0.00000e+00 A 4 = −1.12901e−05 A 6 = 9.46098e−09
A 8 = 9.05188e−11 A10 = −7.93465e−13 A12 = 1.75055e−15
29th Surface
K = 0.00000e+00 A 4 = 4.47967e−06 A 6 = 8.06112e−09
A 8 = 6.09576e−11 A10 = −7.53188e−13 A12 = 1.75840e−15

| VARIOUS DATA ZOOM RATIO 3.33 | | | |
|---|---|---|---|
| | WIDE | MIDDLE | TELE |
| Focal Length | 24.72 | 51.54 | 82.44 |
| Fno | 2.88 | 2.88 | 2.91 |
| Half Angle of View (°) | 37.91 | 22.77 | 14.71 |
| Image Height | 19.25 | 21.64 | 21.64 |
| Overall Lens Length | 141.91 | 160.16 | 178.40 |
| BF | 12.29 | 28.41 | 33.22 |
| d 5 | 0.80 | 15.93 | 31.22 |
| d13 | 21.31 | 7.45 | 2.38 |
| d19 | 4.61 | 8.25 | 9.65 |
| d21 | 6.01 | 2.38 | 0.98 |
| d29 | 1.44 | 1.00 | 1.00 |
| d31 | 20.45 | 21.76 | 24.96 |
| d34 | 12.29 | 28.41 | 33.22 |

| LENS UNIT DATA | | |
|---|---|---|
| Lens Unit | Starting Surface | Focal Length |
| 1 | 1 | 108.93 |
| 2 | 6 | −22.29 |
| 3 | 14 | 37.44 |
| 4 | 20 | −30.62 |
| 5 | 22 | 20.97 |
| 6 | 30 | −56.88 |
| 7 | 32 | 415.07 |

Numerical Example 3

| UNIT: mm | | | | | |
|---|---|---|---|---|---|
| SURFACE DATA | | | | | |
| Surface No. | r | d | nd | vd | Effective Diameter |
| 1 | 152.533 | 2.10 | 1.85478 | 24.8 | 67.12 |
| 2 | 76.488 | 7.08 | 1.72916 | 54.7 | 62.56 |
| 3 | 437.436 | 0.15 | | | 61.87 |
| 4 | 64.426 | 6.94 | 1.59522 | 67.7 | 57.62 |
| 5 | 320.856 | (Variable) | | | 56.50 |
| 6 | 118.740 | 1.30 | 1.88300 | 40.8 | 37.08 |
| 7 | 20.935 | 7.01 | | | 28.83 |
| 8 | −153.370 | 1.10 | 1.59522 | 67.7 | 28.13 |
| 9 | 23.941 | 4.78 | 1.85478 | 24.8 | 25.09 |
| 10 | 172.857 | 3.02 | | | 24.01 |
| 11 | −52.005 | 4.25 | 1.65412 | 39.7 | 22.34 |
| 12 | −18.510 | 1.05 | 1.76385 | 48.5 | 21.46 |
| 13* | −131.986 | (Variable) | | | 23.06 |

15

-continued

| UNIT: mm | | | | | |
|---|---|---|---|---|---|
| 14 (SP) | ∞ | 0.40 | 24.76 | | |
| 15 | 39.037 | 3.19 | 2.00100 | 29.1 | 26.32 |
| 16 | 161.719 | 0.80 | 26.19 | | |
| 17 | 41.765 | 1.10 | 1.88300 | 40.8 | 26.13 |
| 18 | 21.877 | 7.16 | 1.59522 | 67.7 | 25.18 |
| 19 | −97.732 | 4.17 | 24.86 | | |
| 20* | −27.225 | 1.05 | 1.77047 | 29.7 | 23.98 |
| 21 | 43.734 | 4.04 | 1.49700 | 81.5 | 24.91 |
| 22 | −123.349 | (Variable) | 25.41 | | |
| 23 | 32.127 | 7.10 | 1.59522 | 67.7 | 27.15 |
| 24 | −78.950 | 0.35 | 27.67 | | |
| 25 | 32.419 | 6.02 | 1.59522 | 67.7 | 28.04 |
| 26 | −99.887 | 0.15 | 27.47 | | |
| 27* | −3567.913 | 1.70 | 1.85400 | 40.4 | 26.85 |
| 28* | 119.308 | (Variable) | 25.99 | | |
| 29 | 58.951 | 0.90 | 1.80400 | 46.5 | 25.96 |
| 30 | 26.867 | (Variable) | 25.39 | | |
| 31 | −82.113 | 1.40 | 1.61340 | 44.3 | 31.80 |
| 32 | 39.149 | 5.72 | 2.00330 | 28.3 | 35.17 |
| 33 | 604.811 | (Variable) | 35.45 | | |
| Image Plane | ∞ | | | | |

ASPHERIC DATA

13th Surface
K = 0.00000e+00 A 4 = −1.53438e−06 A 6 = −1.13111e−09
A 8 = 1.92582e−11 A10 = −2.79764e−13 A12 = 8.44208e−16
20th Surface
K = 0.00000e+00 A 4 = 7.37287e−06 A 6 = 1.05231e−08
A 8 = 1.68381e−12 A10 = −1.62659e−13 A12 = 4.08281e−16
27th Surface
K = 0.00000e+00 A 4 = 4.07939e−06 A 6 = −4.35164e−08
A 8 = −1.70565e−10 A10 = 8.77481e−13 A12 = −1.05477e−15
28th Surface
K = 0.00000e+00 A 4 = 2.95653e−05 A 6 = −2.84201e−08
A 8 = −2.18521e−10 A10 = 1.04036e−12 A12 = −1.39448e−15

VARIOUS DATA
ZOOM RATIO 3.34

| | WIDE | MIDDLE | TELE |
|---|---|---|---|
| Focal Length | 24.72 | 53.92 | 82.45 |
| Fno | 2.88 | 2.89 | 2.91 |
| Half Angle of View (°) | 38.82 | 21.86 | 14.70 |
| Image Height | 19.89 | 21.64 | 21.64 |
| Overall Lens Length | 143.84 | 159.28 | 174.73 |
| BF | 14.27 | 29.48 | 37.13 |
| d 5 | 0.80 | 19.01 | 31.86 |
| d13 | 21.61 | 6.57 | 2.39 |
| d22 | 4.81 | 1.88 | 1.00 |
| d28 | 1.34 | 2.41 | 1.33 |
| d30 | 17.00 | 15.93 | 17.01 |
| d33 | 14.27 | 29.48 | 37.13 |

LENS UNIT DATA

| Lens Unit | Starting Surface | Focal Length |
|---|---|---|
| 1 | 1 | 103.64 |
| 2 | 6 | −19.93 |
| 3 | 14 | 82.54 |
| 4 | 23 | 24.15 |
| 5 | 29 | −62.18 |
| 6 | 31 | 1115.79 |

16

Numerical Example 4

| UNIT: mm | | | | | |
|---|---|---|---|---|---|

SURFACE DATA

| Surface No. | r | d | nd | vd | Effective Diameter |
|---|---|---|---|---|---|
| 1 | 118.633 | 2.10 | 1.85478 | 24.8 | 61.67 |
| 2 | 74.843 | 6.06 | 1.59522 | 67.7 | 58.03 |
| 3 | 341.871 | 0.15 | 57.11 | | |
| 4 | 71.109 | 5.75 | 1.59522 | 67.7 | 54.65 |
| 5 | 363.658 | (Variable) | 53.81 | | |
| 6 | 167.733 | 1.30 | 1.88300 | 40.8 | 32.76 |
| 7 | 20.705 | 5.15 | 26.31 | | |
| 8 | 1990.121 | 1.10 | 1.59522 | 67.7 | 25.88 |
| 9 | 21.243 | 4.62 | 1.85478 | 24.8 | 23.36 |
| 10 | 114.728 | 1.63 | 22.29 | | |
| 11 | −67.322 | 3.73 | 1.65412 | 39.7 | 22.09 |
| 12 | −21.185 | 1.05 | 1.76385 | 48.5 | 21.29 |
| 13* | −411.223 | (Variable) | 20.06 | | |
| 14 (SP) | ∞ | 0.40 | 21.34 | | |
| 15 | 37.481 | 2.89 | 2.00100 | 29.1 | 22.42 |
| 16 | 250.547 | 0.80 | 22.31 | | |
| 17 | 32.984 | 1.10 | 1.88300 | 40.8 | 22.15 |
| 18 | 20.601 | 5.92 | 1.48749 | 70.2 | 21.36 |
| 19 | −79.896 | 3.10 | 21.02 | | |
| 20* | −24.603 | 1.05 | 1.78880 | 28.4 | 20.40 |
| 21 | 46.293 | 2.86 | 1.49700 | 81.5 | 21.11 |
| 22 | −206.809 | (Variable) | 21.51 | | |
| 23 | 30.041 | 6.55 | 1.59522 | 67.7 | 22.87 |
| 24 | −50.542 | 0.35 | 23.52 | | |
| 25 | 34.114 | 5.69 | 1.59522 | 67.7 | 23.82 |
| 26 | −70.220 | 0.15 | 23.23 | | |
| 27* | −3487.440 | 1.70 | 1.85400 | 40.4 | 22.89 |
| 28* | 104.295 | (Variable) | 22.48 | | |
| 29 | 108.171 | 0.90 | 1.80400 | 46.5 | 22.39 |
| 30 | 26.004 | (Variable) | 22.06 | | |
| 31 | −116.406 | 1.40 | 1.61340 | 44.3 | 30.03 |
| 32 | 37.527 | 5.58 | 1.84666 | 23.8 | 32.93 |
| 33 | 1518.207 | (Variable) | 33.43 | | |
| Image Plane | ∞ | | | | |

ASPHERIC DATA

13th Surface
K = 0.00000e+00 A 4 = −2.19979e−06 A 6 = −3.92638e−09
A 8 = 2.16253e−11 A10 = 1.20024e−13 A12 = −1.24115e−15
20th Surface
K = 0.00000e+00 A 4 = 1.02026e−05 A 6 = 1.45605e−08
A 8 = −4.60953e−11 A10 = 3.55563e−13 A12 = −1.81015e−15
27th Surface
K = 0.00000e+00 A 4 = −3.27702e−05 A 6 = −2.50635e−08
A 8 = 7.81546e−10 A10 = −4.86515e−12 A12 = 1.11082e−14
28th Surface
K = 0.00000e+00 A 4 = −3.94923e−06 A 6 = −7.45729e−09
A 8 = 8.07531e−10 A10 = −5.29537e−12 A12 = 1.24312e−14

VARIOUS DATA
ZOOM RATIO 5.30

| | WIDE | MIDDLE | TELE |
|---|---|---|---|
| Focal Length | 24.72 | 69.21 | 131.00 |
| Fno | 4.08 | 4.08 | 4.12 |
| Half Angle of View (°) | 38.54 | 17.36 | 9.38 |
| Image Height | 19.69 | 21.64 | 21.64 |
| Overall Lens Length | 135.90 | 163.41 | 190.91 |
| BF | 13.40 | 32.85 | 47.26 |
| d 5 | 0.80 | 29.34 | 48.34 |
| d13 | 23.11 | 6.82 | 2.39 |
| d22 | 6.67 | 2.47 | 0.99 |
| d28 | 2.21 | 3.40 | 1.33 |
| d30 | 16.63 | 15.44 | 17.51 |
| d33 | 13.40 | 32.85 | 47.26 |

-continued

UNIT: mm

LENS UNIT DATA

| Lens Unit | Starting Surface | Focal Length |
|---|---|---|
| 1 | 1 | 114.88 |
| 2 | 6 | −20.42 |
| 3 | 14 | 92.65 |
| 4 | 23 | 21.29 |
| 5 | 29 | −42.79 |
| 6 | 31 | 2402.87 |

Numerical Example 5

UNIT: mm

SURFACE DATA

| Surface No. | r | d | nd | vd | Effective Diameter |
|---|---|---|---|---|---|
| 1 | 244.959 | 2.10 | 1.85478 | 24.8 | 70.72 |
| 2 | 109.187 | 5.90 | 1.72916 | 54.7 | 66.85 |
| 3 | 859.737 | 0.15 | | 65.79 | |
| 4 | 66.220 | 7.47 | 1.59522 | 67.7 | 60.48 |
| 5 | 369.275 | (Variable) | | 59.38 | |
| 6 | 89.150 | 1.30 | 1.88300 | 40.8 | 37.81 |
| 7 | 19.271 | 8.49 | | 28.87 | |
| 8 | −133.903 | 1.10 | 1.59522 | 67.7 | 27.51 |
| 9 | 38.612 | 3.96 | 1.85478 | 24.8 | 25.45 |
| 10 | −222.314 | 3.32 | | 24.66 | |
| 11 | −41.614 | 5.26 | 1.65412 | 39.7 | 21.84 |
| 12 | −15.847 | 1.05 | 1.76385 | 48.5 | 21.46 |
| 13* | −84.865 | (Variable) | | 23.42 | |
| 14 (SP) | ∞ | 0.40 | | 25.25 | |
| 15 | 35.646 | 3.20 | 2.00100 | 29.1 | 26.84 |
| 16 | 105.214 | 2.33 | | 26.61 | |
| 17 | 38.313 | 1.10 | 1.88300 | 40.8 | 26.32 |
| 18 | 20.483 | 7.35 | 1.59522 | 67.7 | 25.16 |
| 19 | −114.739 | 3.20 | | 24.73 | |
| 20* | −33.078 | 1.05 | 1.77047 | 29.7 | 23.99 |
| 21 | 35.275 | 3.89 | 1.49700 | 81.5 | 24.39 |
| 22 | −458.384 | 1.76 | | 24.74 | |
| 23 | 28.726 | 6.88 | 1.59522 | 67.7 | 26.36 |
| 24 | −89.764 | 0.35 | | 25.83 | |
| 25 | 35.115 | 5.00 | 1.59522 | 67.7 | 25.07 |
| 26 | −79.121 | 0.15 | | 24.74 | |
| 27* | −4026.920 | 1.70 | 1.85400 | 40.4 | 24.45 |
| 28* | 118.939 | (Variable) | | 24.09 | |
| 29 | 61.496 | 0.90 | 1.80400 | 46.5 | 24.12 |
| 30 | 25.279 | (Variable) | | 23.67 | |
| 31 | −88.401 | 1.40 | 1.61340 | 44.3 | 30.31 |
| 32 | 32.848 | 7.96 | 2.00330 | 28.3 | 34.13 |
| 33 | 198.042 | (Variable) | | 34.65 | |
| Image Plane | ∞ | | | | |

ASPHERIC DATA

13th Surface
K = 0.00000e+00 A 4 = −5.89290e−06 A 6 = 7.20737e−10
A 8 = −3.27030e−11 A10 = −1.47230e−15 A12 = 2.60321e−17
20th Surface
K = 0.00000e+00 A 4 = 3.85594e−06 A 6 = 1.80550e−08
A 8 = −2.20012e−11 A10 = −2.64873e−13 A12 = 7.24324e−16
27th Surface
K = 0.00000e+00 A 4 = −3.06143e−05 A 6 = 9.85581e−09
A 8 = 3.30039e−10 A10 = −6.90894e−13 A12 = −9.71715e−16
28th Surface
K = 0.00000e+00 A 4 = −6.70785e−06 A 6 = 3.40841e−08
A 8 = 1.61547e−10 A10 = 4.28046e−13 A12 = −3.68131e−15

-continued

UNIT: mm

VARIOUS DATA ZOOM RATIO 2.94

| | WIDE | MIDDLE | TELE |
|---|---|---|---|
| Focal Length | 24.72 | 54.00 | 72.71 |
| Fno | 2.88 | 2.89 | 2.91 |
| Half Angle of View (°) | 38.63 | 21.83 | 16.57 |
| Image Height | 19.75 | 21.64 | 21.64 |
| Overall Lens Length | 143.84 | 159.49 | 175.14 |
| BF | 13.38 | 30.66 | 36.76 |
| d 5 | 0.80 | 19.98 | 32.04 |
| d13 | 23.13 | 4.61 | 2.56 |
| d28 | 1.33 | 3.15 | 1.28 |
| d30 | 16.46 | 12.35 | 13.77 |
| d33 | 13.38 | 30.66 | 36.76 |

LENS UNIT DATA

| Lens Unit | Starting Surface | Focal Length |
|---|---|---|
| 1 | 1 | 112.73 |
| 2 | 6 | −21.43 |
| 3 | 14 | 27.72 |
| 4 | 29 | −53.98 |
| 5 | 31 | 147910.83 |

TABLE 1

| | | NUMERICAL EXAMPLE | | | | |
|---|---|---|---|---|---|---|
| INEQUALITY | | 1 | 2 | 3 | 4 | 5 |
| (1) | R1r/fw | 16.88 | 21.40 | 12.98 | 14.71 | 14.94 |
| (2) | mL1/f1 | 0.55 | 0.33 | 0.30 | 0.48 | 0.28 |
| (3) | nd1p | 1.60 | 1.69 | 1.66 | 1.60 | 1.66 |
| (4) | vd1n | 23.78 | 24.80 | 24.80 | 24.80 | 24.80 |
| (5) | |R2r/f2| | 1.08 | 1.01 | 1.05 | 1.01 | 0.90 |
| (6) | f1/ft | 0.77 | 1.32 | 1.26 | 0.88 | 1.55 |
| (7) | |f2/fw| | 0.84 | 0.90 | 0.81 | 0.83 | 0.87 |
| (8) | |f1/f2| | 4.81 | 4.89 | 5.20 | 5.63 | 5.26 |
| (9) | |f1n/f1| | 1.88 | 1.37 | 1.75 | 2.11 | 2.06 |
| (10) | vd2n | 67.74 | 67.74 | 67.74 | 67.74 | 67.74 |
| (11) | |f2/skw| | 1.87 | 1.81 | 1.40 | 1.52 | 1.60 |
| (12) | f1/skt | 2.12 | 3.28 | 2.79 | 2.43 | 3.07 |
| (13) | mL1/mL3 | 1.52 | 1.46 | 1.62 | 1.95 | 1.52 |
| (14) | fnot × hsp/ft | 0.68 | 0.88 | 0.87 | 0.67 | 1.01 |
| (15) | (R1r + R2r)/ (R1r − R2r) | 1.11 | 1.09 | 1.14 | 1.12 | 1.11 |

Image Pickup Apparatus

Figure 16:
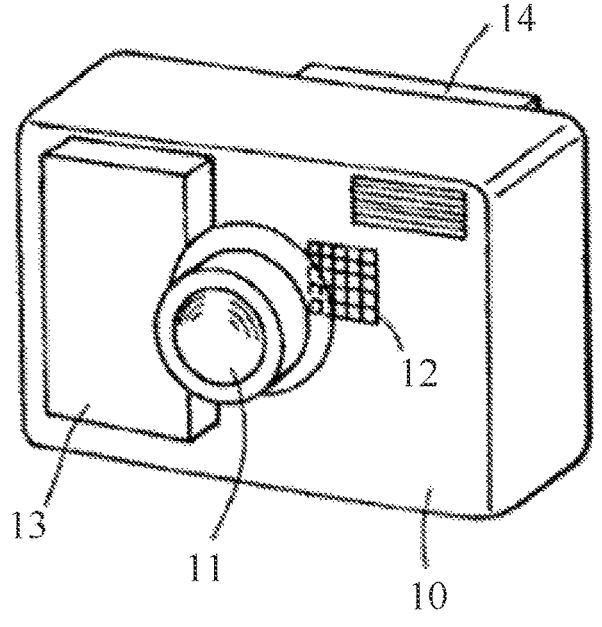
FIG. 16 is a schematic diagram of an image pickup apparatus.

FIG. 16 illustrates a digital still camera as an image pickup apparatus using the zoom lens according to any one of the above examples as an imaging optical system. Reference numeral 10 denotes a camera body, and reference numeral 11 denotes an imaging optical system including any of the zoom lenses according to Examples 1 to 5. A solid-state image sensor 12, such as a CCD sensor or a CMOS sensor, is built into the camera body 10 and captures an optical image (object image) formed by the imaging optical system 11. Reference numeral 13 denotes a recording unit configured to record image data generated by processing the imaging signal from the image sensor 12, and reference numeral 14 denotes a rear display that displays the image data.

Using the zoom lenses according to each example can provide a camera that is small and bright, and can acquire high-quality images.

The camera may be a single-lens reflex camera with a quick turn mirror, or a mirrorless camera without a quick turn mirror. As described above, the zoom lenses according to Examples 1 to 5 can be used for various image pickup apparatuses such as video cameras, broadcasting cameras, and surveillance cameras.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide a small zoom lens that can secure a bright F-number over the entire zoom range and has a high zoom ratio and high optical performance.

This application claims priority to Japanese Patent Application No. 2023-075469, which was filed on May 1, 2023, and which is hereby incorporated by reference herein in its entirety.

What is claimed is:

1. A zoom lens comprising, in order from an object side to an image side:

a first lens unit having positive refractive power;

a second lens unit having negative refractive power; and a rear group having positive refractive power as a whole and including three or more lens units, wherein during zooming, all lens units move and a distance between adjacent lens units changes, wherein a lens unit closest to an image plane in the rear group moves toward the object side during zooming from a wide-angle end to a telephoto end, wherein the first lens unit consists of, in order from the object side to the image side, one negative lens and two positive lenses, and wherein the following inequalities are satisfied:

$$14.71 \le R1r/fw \le 25.0$$
$$0.2 \le mL1/f1 \le 0.7$$
$$20 \le vd1n \le 30$$

where R1r is a radius of curvature of a lens surface closest to the image plane in the first lens unit, fw is a focal length of the zoom lens at the wide-angle end, mL1 is a moving amount of the first lens unit during zooming from the wide-angle end to the telephoto end, the moving amount from the image side to object side the being defined to be positive, f1 is a focal length of the first lens unit, and vd1n is an Abbe number of the negative lens in the first lens unit based on d-line.

2. The zoom lens according to claim 1, wherein all the lenses move toward the object side during from the wide-angle end to the telephoto end.

3. The zoom lens according to claim 1, wherein the following inequality is satisfied:

$$1.55 \le nd1p \le 1.75$$

where nd1p is an average value of a refractive index for d-line of the two positive lenses in the first lens unit.

4. The zoom lens according to claim 1, wherein the second lens unit includes a negative lens closest to the object, and

wherein the following inequality is satisfied:

$$0.8 \le |R2r/f2| \le 1.2$$

where R2r is a radius of curvature of a lens surface on the image side of the negative lens closest to the object, and f2 is a focal length of the second lens unit.

5. The zoom lens according to claim 1, wherein the following inequality is satisfied:

$$0.6 \le f1/ft \le 1.7$$

where ft is a focal length of the zoom lens at the telephoto end.

6. The zoom lens according to claim 1, wherein the following inequality is satisfied:

$$0.7 \le |f2/fw| \le 1.0$$

where f2 is a focal length of the second lens unit, and fw is a focal length of the zoom lens at the wide-angle end.

7. The zoom lens according to claim 1, wherein the following inequality is satisfied:

$$4.4 \le |f1/f2| \le 6.0$$

where f2 is a focal length of the second lens unit.

8. The zoom lens according to claim 1, wherein the following inequality is satisfied:

$$1.2 \le |f1n/f1| \le 2.3$$

where f1n is a focal length of the negative lens in the first lens unit, and f1 is a focal length of the first lens unit.

9. The zoom lens according to claim 1, wherein the second lens unit includes four or more lenses.

10. The zoom lens according to claim 1, wherein the following inequality is satisfied:

$$60 \le vd2n \le 100$$

where vd2n is an Abbe number of a negative lens having a largest Abbe number based on d-line among one or more negative lenses included in the second lens unit.

11. The zoom lens according to claim 1, wherein the following inequality is satisfied:

$$1.1 \le |f2/skw| \le 2.2$$

where f2 is a focal length of the second lens unit, and skw is a back focus of the zoom lens at the wide-angle end.

12. The zoom lens according to claim 1, wherein the following inequality is satisfied:

$$1.8 \leq f1/skt \leq 3.6$$

where skt is a back focus of the zoom lens at the telephoto end.

13. The zoom lens according to claim 1, wherein the rear group includes a third lens unit, and wherein the following inequality is satisfied:

$$1.2 \leq mL1/mL3 \leq 2.2$$

where mL3 is a moving amount of the third lens unit during zooming from the wide-angle end to the telephoto end, which moving amount is positive when the third lens unit is closer to the object at the telephoto end than at the wide-angle end.

14. The zoom lens according to claim 1, further comprising an aperture stop, wherein the following inequality is satisfied:

$$0.6 \leq fnot \times hsp/ft \leq 1.1$$

where fnot is an F-number of the zoom lens at the telephoto end, hsp is an effective diameter of the aperture stop at the telephoto end, and ft is a focal length of the zoom lens at the telephoto end.

15. The zoom lens according to claim 1, wherein the following inequality is satisfied:

$$1.00 \leq (R1r + R2r)/(R1r - R2r) \leq 1.25$$

where R1r is a radius of curvature of a lens surface closest to the image plane in the first lens unit, and R2r is a radius of curvature of a lens surface closest to the image plane of a negative lens closest to the object in the second lens unit.

16. The zoom lens according to claim 1, comprising, in order from the object side to the image side:

the first lens unit;

the second lens unit;

a third lens unit having positive refractive power;

a fourth lens unit having negative refractive power;

a fifth lens unit having positive refractive power;

a sixth lens unit having negative refractive power; and a seventh lens unit having negative refractive power.

17. The zoom lens according to claim 1, comprising, in order from the object side to the image side:

the first lens unit;

the second lens unit;

a third lens having positive refractive power;

a fourth lens unit having negative refractive power;

a fifth lens unit having positive refractive power;

a sixth lens unit having negative refractive power; and a seventh lens unit having positive refractive power.

18. The zoom lens according to claim 1, comprising, in order from the object side to the image side:

the first lens unit;

the second lens unit;

a third lens having positive refractive power;

a fourth lens unit having positive refractive power;

a fifth lens unit having negative refractive power; and a sixth lens unit having positive refractive power.

19. The zoom lens according to claim 1, comprising, in order from the object side to the image side:

the first lens unit;

the second lens unit;

a third lens having positive refractive power;

a fourth lens unit having negative refractive power; and a fifth lens unit having positive refractive power.

20. An image pickup apparatus comprising:

a zoom lens; and an image sensor configured to capture an object through the zoom lens, wherein the zoom lens includes, in order from an object side to an image side:

a first lens unit having positive refractive power;

a second lens unit having negative refractive power; and a rear group having positive refractive power as a whole and including three or more lens units, wherein during zooming, all lens units move and a distance between adjacent lens units changes, wherein a lens unit closest to an image plane in the rear group moves toward the object side during zooming from a wide-angle end to a telephoto end, wherein the first lens unit consists of, in order from the object side to the image side, one negative lens and two positive lenses, and wherein the following inequalities are satisfied:

$$14.71 \leq R1r/fw \leq 25.0$$

$$0.2 \leq mL1/f1 \leq 0.7$$

$$20 \leq vd1n \leq 30$$

where R1r is a radius of curvature of a lens surface closest to the image plane in the first lens unit, fw is a focal length of the zoom lens at the wide-angle end, mL1 is a moving amount of the first lens unit during zooming from the wide-angle end to the telephoto end, the moving amount from the image side to object side the being defined to be positive, f1 is a focal length of the first lens unit, and vd1n is an Abbe number of the negative lens in the first lens unit based on d-line.

\* \* \* \* \*